(12) United States Patent
Jung

(10) Patent No.: US 10,216,677 B2
(45) Date of Patent: Feb. 26, 2019

(54) ELECTRONIC APPARATUS AND CONTROL METHOD THEREOF WITH IDENTIFICATION OF SENSOR USING HISTORY

(71) Applicant: SAMSUNG ELECTRONICS CO., LTD., Suwon-si, Gyeonggi-do (KR)

(72) Inventor: Ji-woon Jung, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 42 days.

(21) Appl. No.: 15/390,094

(22) Filed: Dec. 23, 2016

(65) Prior Publication Data

US 2017/0185557 A1  Jun. 29, 2017

(30) Foreign Application Priority Data

Dec. 24, 2015 (KR) .................. 10-2015-0186066

(51) Int. Cl.
*G06F 13/38* (2006.01)
*G06F 13/40* (2006.01)
*G06F 13/42* (2006.01)

(52) U.S. Cl.
CPC ...... *G06F 13/4031* (2013.01); *G06F 13/4282* (2013.01)

(58) Field of Classification Search
CPC .......... G06F 13/38; G06F 13/40; G06F 13/42
See application file for complete search history.

(56) References Cited

U.S. PATENT DOCUMENTS

| 5,839,094 A * | 11/1998 | French | G01D 3/022 702/91 |
| 6,326,806 B1 | 12/2001 | Fallside et al. | |
| 6,720,887 B1 * | 4/2004 | Zunti | G08C 17/02 128/903 |
| 8,615,374 B1 * | 12/2013 | Discenzo | G06F 15/00 219/497 |
| 9,424,217 B2 * | 8/2016 | Santesson | G06F 13/102 |
| 2005/0033540 A1 * | 2/2005 | Bathurst | G01D 3/022 702/117 |
| 2012/0278796 A1 * | 11/2012 | Sandlin | G06F 9/4411 717/174 |

FOREIGN PATENT DOCUMENTS

| EP | 2 554 194 | 2/2013 |
| JP | 2010-191509 | 9/2010 |
| JP | 2011-212045 | 10/2011 |

* cited by examiner

*Primary Examiner* — David E Martinez
(74) *Attorney, Agent, or Firm* — Nixon & Vanderhye P.C.

(57) ABSTRACT

An electronic apparatus is provided, the electronic apparatus including: an interface comprising interface circuitry configured to be connectable with at least one of a plurality of sensor modules for sensing an object; a programmable circuit configured to be selectively loaded with at least one of a plurality of hardware images corresponding to the plurality of sensor modules, and to process a sensing signal obtained by sensing the object through the sensor module corresponding to the loaded hardware image; and a controller configured to determine at least one hardware image corresponding to the sensor module connected to the interface from among the plurality of hardware images, and to load the at least one determined hardware image to the programmable circuit.

18 Claims, 34 Drawing Sheets

FIG. 10

| IDENTIFICATION INFORMATION | THE KINDS OF SENSOR MODULE |
|---|---|
| 0,0,0,0,1 | ULTRASONIC TRANSDUCER |
| 0,0,0,0,0 | DERMATOSCOPE |
| 0,0,0,1,0 | OTOSCOPE |
| 0,0,0,1,1 | OPHTHALMOSCOPE |
| 0,0,1,0,0 | ECG SENSOR |
| 0,0,1,0,1 | PPG SENSOR |
| ⋮ | ⋮ |

| PRIORITY | SENSOR MODULES |
|---|---|
| 1 | ULTRASONIC TRANSDUCER |
| 2 | ECG SENSOR |
| 3 | PPG SENSOR |
| 4 | DERMATOSCOPE |
| 5 | OPHTHALMOSCOPE |
| ⋮ | ⋮ |

1430

ELECTRONIC APPARATUS AND CONTROL METHOD THEREOF WITH IDENTIFICATION OF SENSOR USING HISTORY

CROSS-REFERENCE TO RELATED APPLICATION

This application is based on and claims priority under 35 U.S.C. § 119 to Korean Patent Application No. 10-2015-0186066 filed on Dec. 24, 2015 in the Korean Intellectual Property Office, the disclosure of which is incorporated by reference herein in its entirety.

BACKGROUND

Field

The present disclosure relates generally to an electronic apparatus, which senses and provides biological characteristics of an object including a human so that current physiological conditions of the object can be diagnosed based on sensing results, and a control method thereof, and for example to an electronic apparatus, which has an improved structure of simplifying an inner structure and reducing a physical size of a main body for sensing a plurality of biological characteristics from an object, and a control method thereof.

Description of Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer (PC), a server or the like for processing general information; a display apparatus for displaying an image based on video information; a sensing apparatus for sensing characteristics of various objects and performing processes based on sensing results; etc. With development of technology, the electronic apparatus may not belong to a certain category. However, if the electronic apparatus is applied to a specific technical field or specific usage, functions thereof may be specialized to meet the specific field. For example, if the object is a living thing such as a human, an animal, etc., the electronic apparatus may be provided as a medical apparatus for sensing the biological characteristics of the object and making a proper physiological diagnosis.

The medical apparatus requiring high precision in sensing and processing the object is so complicated and big that it is stationary and used on a certain installation surface. On the other hand to the medical apparatus having the big and complicated structure, there is a medical apparatus having a simpler structure and capable of more quickly sensing and diagnosing an object. Such a medical apparatus is relatively small and lightweight enough to be easily carried by a doctor or an individual user.

By the way, there is a great variety of biological characteristics sensed from an object. For example, the sensing apparatus regarded as the medical apparatus may be used for ultrasonic testing. The sensing apparatus emits ultrasonic waves to the object and receives reflected ultrasonic waves, thereby generating information about the transmitted and received ultrasonic waves so as to display a sonogram. The sensing apparatus sends the information about the transmitted and received ultrasonic waves to a separate display apparatus so that the display apparatus can display a sonogram.

In accordance with what characteristics of the object will be sensed, a sensor, a processor and the like hardware of the sensing apparatus are different. If one sensing apparatus is used in sensing and processing many characteristics, the sensing apparatus is increased in size and becomes complicated. To make the sensing apparatus small enough to be easily carried by a user, sensing apparatuses have been individually manufactured corresponding to the characteristics of the object to be sensed. However, it is inconvenient for a user to carry the plurality of sensing apparatuses respectively corresponding to the plurality of characteristics. Accordingly, the sensing apparatus is required to have a single main body to meet the plurality of characteristics.

SUMMARY

An electronic apparatus is provided, the electronic apparatus including: an interface comprising interface circuitry configured to be connectable with at least one of a plurality of sensor modules configured to sense an object; a programmable circuit configured to be selectively loaded with at least one of a plurality of hardware images corresponding to the plurality of sensor modules, and to process a sensing signal obtained by sensing the object through the sensor module corresponding to the loaded hardware image; and a controller configured to determine at least one hardware image corresponding to the sensor module connected to the interface among the plurality of hardware images, and to control the at least one determined hardware image to be loaded to the programmable circuit. Thus, the electronic apparatus has a simple, small and lightweight structure and is capable of using a plurality of sensor modules to sense various characteristics of an object.

The programmable circuit may include a field programmable gate array (FPGA), the controller may change an internal circuit structure of the FPGA based on the hardware images including a circuit layout of a digital signal processor (DSP) designed corresponding to the sensor module connected to the interface. Thus, the DSPs respectively corresponding to the plurality of sensor modules do not have to be individually provided but are achieved by a single chipset.

The controller may change a system bus between the controller and the FPGA changed corresponding to the circuit layout based on a bus architecture provided corresponding to the sensor module. Thus, the bus between the FPGA and the controller is achieved corresponding to each of the plural sensor modules.

The controller may determine the sensor module based on identification information of the sensor module, and may acquire the hardware image of the determined sensor module. Thus, it is possible to determine the circuit structure of the FPGA corresponding to the sensor module.

The interface may be configured to selectively connect with at least one among the plurality of sensor modules. Thus, the electronic apparatus can have a small main body even though it can sense various characteristics of the object.

The interface may include a plurality of terminals to which the sensor module is electrically connected when the sensor module is mounted, and the sensor module may be provided to apply a high or low state to each of the plurality of terminals, the controller may determine the sensor module based on the states of the plurality of terminals caused by the sensor module. Thus, it is easy to determine what kind of sensor module is mounted to the main body.

The sensor module may previously store the identification information, the controller may acquire the identification information from the sensor module when the sensor module is mounted to the interface. Thus, it is easy to determine what kind of sensor module is mounted to the main body.

The electronic apparatus may further include a storage configured to store the hardware image, wherein the controller, if it is determined that the sensor module transmitting the sensing signal through the interface is determined, may determine whether a history of using the determined sensor module is present, and may retrieve the hardware image corresponding to the determined sensor module from the storage if the history of using the determined sensor module is present. Thus, it is possible to acquire the hardware image more quickly without the external communication.

The electronic apparatus may further include a communicator comprising communication circuitry configured to communicate with an external apparatus, wherein the controller may make a request for the hardware image to the external apparatus through the communicator if the history of using the determined sensor module is not present. Thus, it is possible to acquire the hardware image not stored in the electronic apparatus.

The electronic apparatus may further include a communicator comprising communication circuitry configured to communicate with an external apparatus including a display, wherein the controller may transmit sensing information generated by processing the sensing signal through the programmable circuit to the external apparatus so that the sensing information can be displayed as an image on the display.

The electronic apparatus may further include a display, wherein the controller may control the display to display an image based on sensing information generated by processing the sensing signal through the programmable circuit.

If sensing signals are received from two or more sensor modules through the interface, the controller may reset the FPGA by sharing resources of the FPGA and changing the shared resources based on the circuit layouts of the DSPs respectively corresponding to the two or more sensor modules. Thus, the respective sensing signals are processible by one FPGA even if the plurality of sensor modules are used together at the same time.

If the resources for a third sensor module for transmitting the sensing signal through the interface is insufficient while the resources of the FPGA are reset corresponding to a first sensor module and a second sensor module, the resources corresponding to one of the first sensor module and the second sensor module may be reset in accordance with preset priority so as to be used in resetting the third sensor module. Thus, the DSP corresponding to the frequently used sensor module is directly realized in the FPGA, and therefore there are no needs of newly setting the FPGA when the frequently used sensor module is mounted.

A method of controlling an electronic apparatus including an interface and a programmable circuit is provided, the method including: connecting the interface with at least of a plurality of sensor modules for sensing an object; determining at least one hardware image corresponding to the sensor module connected to the interface among a plurality of hardware images respectively corresponding to the plurality of sensor modules; resetting the programmable circuit by loading the programmable circuit with the at least one determined hardware image, so that the sensor module corresponding to the loaded hardware image can process a sensing signal obtained by sensing the object; and processing the sensing signal transmitted through the interface by the reset programmable circuit. Thus, the electronic apparatus has a simple, small and lightweight structure and is capable of using a plurality of sensor modules to sense various characteristics of an object.

The programmable circuit may include a field programmable gate array (FPGA), the resetting the programmable circuit may include changing an internal circuit structure of the FPGA based on the hardware images including a circuit layout of a digital signal processor (DSP) designed corresponding to the sensor module connected to the interface. Thus, the DSPs respectively corresponding to the plurality of sensor modules does not have to be individually provided but are achieved by a single chipset.

The resetting the programmable circuit may include changing a system bus of the FPGA changed corresponding to the circuit layout based on a bus architecture provided corresponding to the sensor module. Thus, the bus between the FPGA and the controller is achieved corresponding to each of the plural sensor modules.

The determining the at least one hardware image may include determining the sensor module based on identification information of the sensor module, and may acquire the hardware image of the determined sensor module. Thus, it is possible to determine the circuit structure of the FPGA corresponding to the sensor module.

The interface may include a plurality of terminals to which the sensor module is electrically connected when the sensor module is mounted, and the sensor module may be provided to apply a high or low state to each of the plurality of terminals, and wherein the determining the sensor module may include determining the sensor module based on the states of the plurality of terminals caused by the sensor module. Thus, it is easy to determine what kind of sensor module is mounted to the main body.

The sensor module may previously store the identification information, and the determining the at least one hardware image may include acquiring the identification information from the sensor module when the sensor module is mounted to the interface. Thus, it is easy to determine what kind of sensor module is mounted to the main body.

The determining the at least one hardware image may include determining whether a history of using the determined sensor module is present if the sensor module for transmitting the sensing signal through the interface is determined; and retrieving the hardware image corresponding to the determined sensor module from a storage of the electronic apparatus if the history of using the determined sensor module is present. Thus, it is possible to acquire the hardware image more quickly without the external communication.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein:

FIG. 10 is a diagram illustrating an example of a DB provided for determining the kind of sensor module in the sensing apparatus according to the fourth example embodiment;

FIG. 24 is a diagram illustrating an example of a list showing a resource usage priority set in the sensing apparatus according to the fourteenth example embodiment;

DETAILED DESCRIPTION

Below, example embodiments will be described in greater detail with reference to accompanying drawings. The following descriptions of the example embodiments are made by referring to elements illustrated in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Further, the example embodiments may describe only elements directly related to the idea of the disclosure, and description of the other elements may be omitted for clarity. However, it will be appreciated that the elements, the descriptions of which are omitted, are not unnecessary to realize the apparatus or system according to the example embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Further, the various example embodiments respectively described with reference to the accompanying drawings are not exclusive to each other unless otherwise mentioned, and a plurality of embodiments may be selectively combined within one apparatus. The combination of these plural embodiments may be discretionally selected and applied to realize the present disclosure by a person having an ordinary skill in the art.

Figure 1:
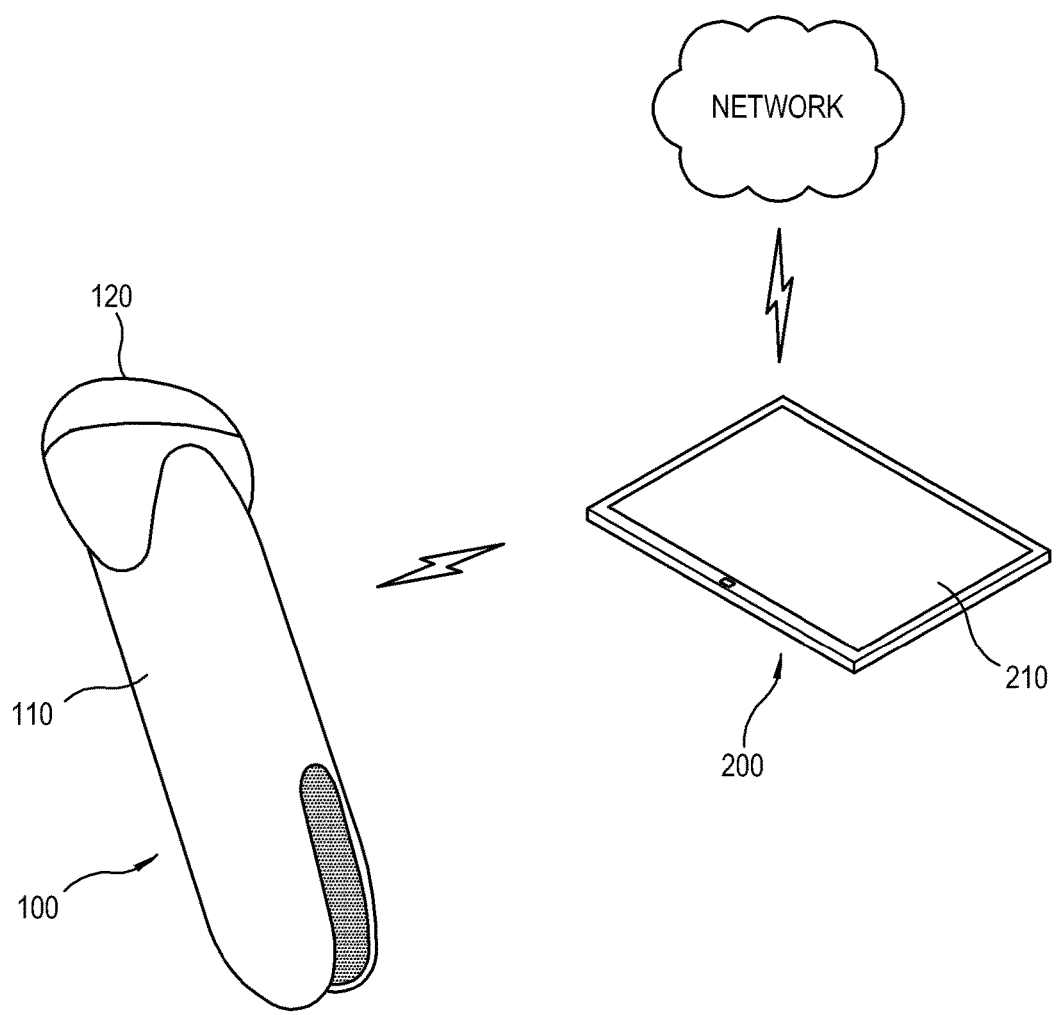
FIG. 1 is a diagram illustrating an example medical apparatus system according to a first example embodiment.

FIG. 1 is a diagram illustrating an example medical apparatus system according to a first example embodiment.

As illustrated in FIG. 1, the medical apparatus system according to the first example embodiment includes a sensing apparatus 100 for sensing biological characteristics or conditions of an object and generating sensing information, and a host apparatus 200 for processing the sensing information generated by the sensing apparatus 100 and displaying a corresponding image on a display panel 210 thereof. A communication network may be established for exchanging information between the sensing apparatus 100 and the host apparatus 200, and the host apparatus 200 may connect with Internet and the like wide area network and communicate with a separate server (not shown).

The sensing apparatus 100 includes a main body of which the size and weight are enough to be carried by a user. In this case, the communication network between the sensing apparatus 100 and the host apparatus 200 is achieved based on a wireless protocol rather than a wired connection so that a user can carry the sensing apparatus 100 without interference. The wireless protocol may include one or more various methods such as Wi-Fi, Bluetooth, etc. However, the system may be also designed for a wired connection between the sensing apparatus 100 and the host apparatus 200.

In the system according to an example embodiment, the object to be sensed by the sensing apparatus 100 may include, for example, and without limitation, a human, an animal and the like living things. The biological characteristics of the object refer to various biological symptoms, reactions and conditions.

Further, a user who uses the system according to an example embodiment may be the same as the object or different from the object. When a user is different from the object, the system is used by a doctor, a nurse, a medical laboratory technologist or a medical expert to diagnose a patient. On the other hand, when a user is the same as the object, the system is used by a general user to diagnose the user's own body conditions.

The sensing apparatus 100 includes a main body 110, and a sensor 120 mounted, for example, to a certain end portion of the main body 110. The main body 110 includes a processor (not shown) for a basic process and computation, and a battery (not shown) for supplying power. The sensor 120 senses a preset characteristic of the object, and transmits a sensing signal according to the sensing results to the processor (not shown). The sensor 120 operates with power supplied from the main body 110. The processor (not shown) processes the sensing signal received from the sensor 120 in accordance with preset processes and acquires sensing data according to the sensing results.

The host apparatus 200 processes the sensing data received from the sensing apparatus 100, and displays the processing results as an image on a display panel 210 as necessary. Therefore, the host apparatus 200 is achieved by a display apparatus such as a computer with a monitor, a tablet computer, a laptop computer, a mobile phone, or the like, but is not limited thereto. Of course, the sensing apparatus 100 and the host apparatus 200 may be combined into a single apparatus according to an example embodiment. However, the display panel 210 for displaying an image necessarily increases the size and weight of the apparatus, and the sensing apparatus 100 has to be small and easy to carry. To this end, the sensing apparatus 100 is provided separately from the host apparatus 200 having the display panel 210.

Further, the host apparatus 200 may be provided to execute maintenance of the sensing apparatus 100. For example, the host apparatus 200 receives information about operations of the sensing apparatus 100 such as error of the sensor, a remain power level of the battery (not shown), etc. from the sensing apparatus 100, and displays the information on the display panel 210, thereby informing a user the current state of the sensing apparatus 100.

With this structure, one sensor 120 senses one characteristic among many biological characteristics of the object. In a conventional sensing apparatus, it is impossible to separate the sensor from the main body, and thus one characteristic is sensed and processed per the sensing apparatus. Therefore, to sense various biological characteristics of an object in such a case, there is a need of a plurality of sensing apparatuses having the sensors respectively corresponding to the characteristics.

Such a conventional case is inconvenient for a user, and thus the following example embodiment will be proposed to avoid the inconvenience.

Figure 2:
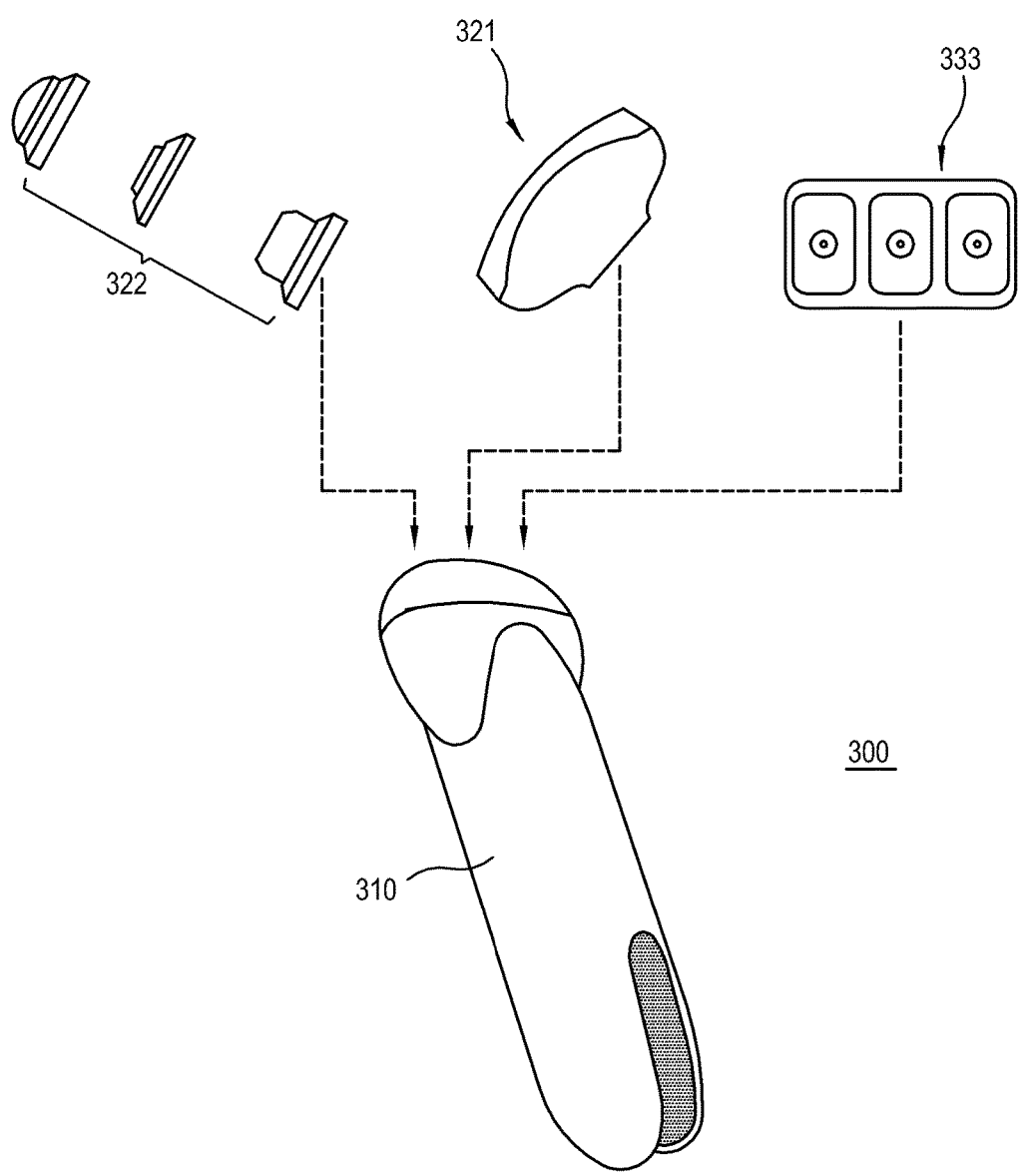
FIG. 2 is a diagram illustrating an example sensing apparatus in a medical apparatus system according to a second example embodiment.

FIG. 2 is a diagram illustrating an example sensing apparatus 300 in a medical apparatus system according to a second example embodiment;

As illustrated in FIG. 2, the sensing apparatus 300 according to the second example embodiment includes a main body 310, and a plurality of sensor modules 321, 322 and 333 detachably provided at one end of the main body 310. The plurality of sensor modules 321, 322 and 333 are each provided to sense one among the biological characteristics of the object, and alternately mounted to and detached from the main body 310.

A user mounts the sensor module 321, 322 or 333, which corresponds to the characteristic desired to be currently sensed among the plurality of sensor modules 321, 322 and 333 to the main body 310. If it is desired to sense a characteristic different from the characteristic corresponding to the sensor module 321, 322 or 333 currently mounted to the main body 310, a user detaches the sensor module 321, 322 or 333 currently mounted to the main body 310 and then mounts another sensor module 321, 322 or 333 corresponding to the different characteristic to the main body 310. Since built-in elements for operating the sensor modules 321, 322 and 333 are provided in the main body 310, the sensing apparatus 300 can sense various characteristics by changing the sensor module 321, 322 or 333 in the main body 310.

This structure according to the second example embodiment is more improved than that of the first example embodiment where the plurality of sensing apparatuses 300 is required corresponding to the plurality of biological characteristics desired to be sensed. In the second example embodiment, only one main body 310, which occupies most of the volume and weight in the sensing apparatus 300, is provided in the sensing apparatus 300, and the sensor module 321, 322 or 333 respectively corresponding to the biological characteristics are alternately mounted to the main body 310, thereby achieving miniaturization and convenience of the sensing apparatus 300.

It may be variously determined what kind of sensor module 321, 322 or 333, e.g., which sensor module 321, 322 or 333 senses which biological characteristic in accordance with design and manufacture. For example, the sensor module 321, 322 or 333 may include an ultrasonic transducer 321, a dermatoscopic or optometric lens 322, an electrocardiogram (ECG) sensor 323, or the like, but is not limited thereto. Besides, a Photo-plethysmography (PPG) sensor and the like sensor modules 321, 322 or 333 may be provided corresponding to various biological characteristics.

Below, the sensor modules 321, 322 and 333 related to some biological characteristics will be schematically described.

The ultrasonic transducer 321 is mounted to the main body 310 so as to transmit ultrasonic waves to an object and receive reflected waves from the object. The ultrasonic transducer 321 is achieved by a transducer array that includes a plurality of conversion devices for conversion between an electric signal and an acoustic signal. The plurality of conversion devices in the ultrasonic transducer 321 may include piezoelectric devices. The plurality of piezoelectric devices may be manufactured by dicing a piezoelectric material formed long. The piezoelectric material includes piezoelectric ceramics, monocrystalline substances, or composite piezoelectric substances where polymer combines with piezoelectric ceramics and monocrystalline substances.

The ultrasonic transducer 321 may for example include a piezoelectric ultrasonic transducer using a piezoelectric effect of the piezoelectric material, a capacitive micromachined ultrasonic transducer (cMUT) for conversion between an ultrasonic wave and an electric signal based on change in capacitance, a magnetic micromachined ultrasonic transducer (mMUT) for conversion between an ultrasonic wave and an electric signal based on change in a magnetic field, an optical ultrasonic detector for conversion between an ultrasonic wave and an electric signal based on change in optical properties, etc.

The ultrasonic transducer 321 may be achieved by a one-dimensional transducer array where a plurality of devices are one-dimensionally arrayed on a plane perpendicular to a traveling direction of an ultrasonic wave, or a two-dimensional transducer array where a plurality of devices are two-dimensionally arrayed on the plane perpendicular to the traveling direction of the ultrasonic wave. The plurality of devices may be arrayed linearly or curvedly.

Here, the two-dimensional transducer array properly delays input time of signals input to the respective devices, transmits the ultrasonic waves to the object along an outer scan line and gets a three-dimensional image based on a plurality of reflected waves. Therefore, the two-dimensional transducer array is more convenient to achieve a three-dimensional image.

The ultrasonic transducer 321 may further include a light source for emitting light to the object, in which the light source is configured to emit light having a specific wavelength. The wavelength of the light emitted from the light source is determined corresponding to a target in the object.

If ultrasonic waves are transmitted from the ultrasonic transducer 321 to a specific part inside a body of an object, the ultrasonic waves are partially reflected from layers between many different tissues. The ultrasonic waves are reflected from anatomical objects changed in density inside a body, for example, blood cells in blood plasma, small structures in organs, etc.

The ultrasonic transducer 321 generates an ultrasonic signal in response to a control signal from the main body 310, emits the ultrasonic signal to the object, and receives waves reflected from specific organs in the object. The reflected waves vibrate the ultrasonic transducer 321 so that the ultrasonic transducer 321 outputs electric pulses due to the vibration. The electric pulses are ultimately displayed as an image on the host apparatus. If the anatomical objects are different in reflectivity of reflecting the ultrasonic waves, the sonogram shows the anatomical objects with different brightness.

An ophthalmoscope 322 may be used to examine a base and medium of eyes, for example, used in observation and refraction examination of a fundus, a vitreous body, a crystalline lens. The ophthalmoscope 322 includes illumination system like a light source, a condenser lens, an aperture, a filter, a projection lens and such as a reflection device. When the eyes of the object are illuminated by the light from the light source, the ophthalmoscope 322 is designed to use a reflection prism so that total-reflected light can widely illuminate the fundus through a lower end of a pupil of the object. Green light having a short wavelength of the illumination light is well reflected from a surface layer of a retina, and therefore a green filter may be used in diagnosis for nervous tissues.

The green filter used in the ophthalmoscope 322 increases a contrast between a retinal vessel and a surrounding background. Therefore, a region of a retinal lesion looks black but a region of a choroidal lesion looks gray on an image showing the results sensed by the ophthalmoscope 322, and it is thus easy for a user distinguish between the regions.

A diameter of the aperture used in the ophthalmoscope 322 changes a cross-section of an optical beam emitted to a cornea and a retina. Therefore, several apertures different in diameter are provided in the illumination system and selectively used in accordance with the sizes of pupil or observation region of the object.

An electrocardiogram (ECG) sensor 333 may sense an ECG that shows electric activities of a heart for a preset period of time. The ECG is sensed through contact with a skin, and the activities of the heart sensed by the ECG sensor 333 for a preset period of time are displayed as images. The ECG is used for not only measuring a heartbeat rate and steadiness, but also determining the size and position of a heart, whether the heart is injured, and an effect of a cardiac pacemaker or the like device or drug for helping heartbeats in the right way.

Since the ECG is used to measure an abnormal rhythm of a heart, it is suitable for measuring the abnormal rhythm due to an injury in conduction tissues of transmitting an electric signal. For example, the ECG is suitable for detecting that a specific region of a myocardium is insured in case of myocardial infarction. However, the ECG is not suitable for detecting a systolic force of the heart.

The ECG sensor 333 detects a weak electric signal sensed on a skin when a myocardium is depolarized at every heartbeat. The sensing apparatus 300 amplifies such a detected electric signal and then transmits the amplified signal to the host apparatus. Myocardial cells have negative charges when they are paused, which is called a membrane potential. This negative charges decrease toward '0' due to introduction of positive charges such as Na+, Ca++ and the like cations, which is called depolarization. While a healthy heart beats, a signal coming out of a sinoatrial node has an orderly depolarization waveform spreading throughout ventricles.

A dermatoscopic lens is a sensor for sensing a skin state of an object. For example, an optical beam having a specific wavelength is emitted to a skin, and a unique fluorescent color of the skin exposed to the optical beam is analyzed to thereby diagnose the skin state. The dermatoscopic lens may for example include a white light emitting diode (LED) or an ultraviolet lamp.

The dermatoscopic lens with the white LED emits white light similar to natural light, and digitalizes a dermal reaction with the light, thereby providing an enlarged image to be displayed. The dermatoscope lens with the ultraviolet lamp emits ultraviolet rays to a skin infected with a fungus, and senses unique fluorescence generated by the fungus on the skin exposed to the ultraviolet rays, thereby easily diagnosing whether the object is infected with the fungus.

The photo-plethysmography (PPG) sensor refers to a sensor for sensing a photoplethysmogram (PPG). The PPG is a signal for measuring change in blood volume of a blood vessel as a heart beats, based on absorption, reflection and scattering of light. For example, the PPG is used for measuring pulses in a stable condition and oxygen saturation in the blood.

Respiration includes inspiration caused by contraction of muscles related to inspiratory movement, and expiration caused by relaxation of the contracted external intercostal muscles. Such a respiration signal is one of vital signs showing the conditions and function of the body, which has a much effect on heart rate variability (HRV) and is very important in monitoring conditions of an ischemic heart disease patient and pathogenesis of a respiratory distress syndrome of a newborn infant. Besides, sudden respiratory distress is directly connected to life and has to be treated for a short period of time, and it is therefore very important to monitor a respiration signal. As the oldest method of measuring a respiration rate, a user may count the respirations of a patient, but this is a quite time-consuming method and inaccuracy. Accordingly, there has been proposed a method of extracting respiration-induced intensity variation (RIIV) from the PPG signal.

The PPG sensor basically includes an LED unit for emitting infrared light, and a photodetector for detecting the infrared light. Since the photodetector detects transmittance of light changed as much as increase/decrease of hemoglobin, erythrocytes, leukocytes and the like in the blood, the PPG sensor is based on a principle that a signal is varied depending on conditions of such blood vessels. The PPG sensor basically includes an HPF and LPF for filtering the detected signal, and an amplification circuit for amplifying the signal.

The foregoing descriptions are merely examples of schematically describing the sensor modules 321, 322 and 333. Therefore, the sensor module 321, 322 or 333 mountable to the main body 310 is not limited to the foregoing descriptions, and may include an additional element when manufactured. For example, there may be provided an additional sensor module for sensing biological characteristics not mentioned above.

Figure 3:
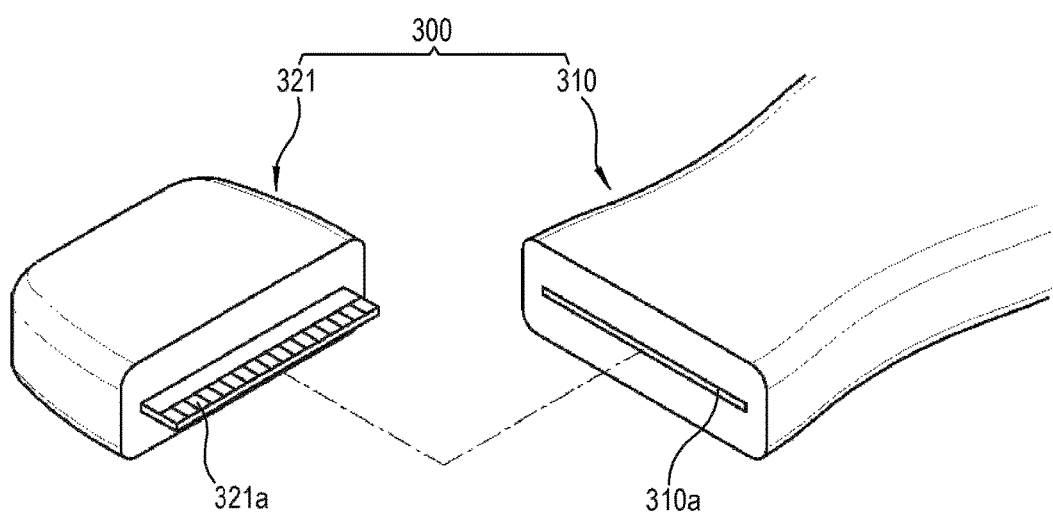
FIG. 3 is a perspective view illustrating an example structure where a sensor module is mounted to a main body in the sensing apparatus according to the second example embodiment.

FIG. 3 is a perspective view illustrating an example structure in which the sensor module 321 is mounted to the main body 310 in the sensing apparatus 300 according to the second example embodiment.

As illustrated in FIG. 3, the sensing apparatus 300 is formed with a slot 310a at one end portion of the main body 310. The slot 310a includes a plurality of terminals electrically connecting with the processor (not shown) and the battery (not shown) in the main body 310, respectively, and is provided to couple with a connector 321a of the sensor module 321. In this example embodiment, the connector 321a is accommodated in the slot 310a, but the coupling structure between the main body 310 and the sensor module 321 is not limited to this example. For example, the structure corresponding to the connector 321a may be formed in the main body 310, and the structure corresponding to the slot 310a may be formed in the sensor module 321. In addition, a separate coupling structure for coupling the main body 310 and the sensor module 321 is provided, and the terminal of the main body 310 and the terminal of the sensor module 321 may be electrically coupled to each other separately from such a coupling structure.

The connector 321a is provided at one end portion of the sensor module 321, and electrically connected to an internal circuit of the sensor module 321. The connector 321a is connected to the slot 310a and makes it possible to exchange a signal between the main body 310 and the sensor module 321, so that the main body 310 can supply power to the sensor module 321 via the slot 310a and the connector 321a and receive the sensing signal from the sensor module 321.

The main body 310, e.g., the processor (not shown) of the main body 310 may recognize the sensor module 321 currently mounted to the main body 310 through various methods. If the system of the main body 310 is turned on, the main body 310 performs booting or initializing for operations. During the initializing, the main body 310 checks the internal elements of the main body 310 and the sensor module 321 and activates the sensing apparatus 300 to operate if the checking results are good. During this process, the main body 310 recognizes the sensor module 321 currently mounted thereto.

If the sensing apparatus 300 supports hot plugging detection (HPD), the main body 310 can sense that the sensor module 321 is mounted in the state that the current system is turned on. For example, if the connector 321a of the sensor module 321 is coupled to the slot 310a, an HPD signal is transmitted from one among many terminals of the slot 310a to the processor (not shown) and thus the main body 310 recognizes the sensor module 321.

Here, the main body 310 not only recognizes whether the sensor module 321 is mounted thereto, but also determines what kind of sensor module 321 is mounted thereto. For example, the main body 310 may need to determine whether the currently mounted sensor module 321 is the ultrasonic transducer or the ECG sensor. This determination may be achieved variously, and details thereof will be described later.

Below, elements of the main body 310 will be described in greater detail.

Figure 4:
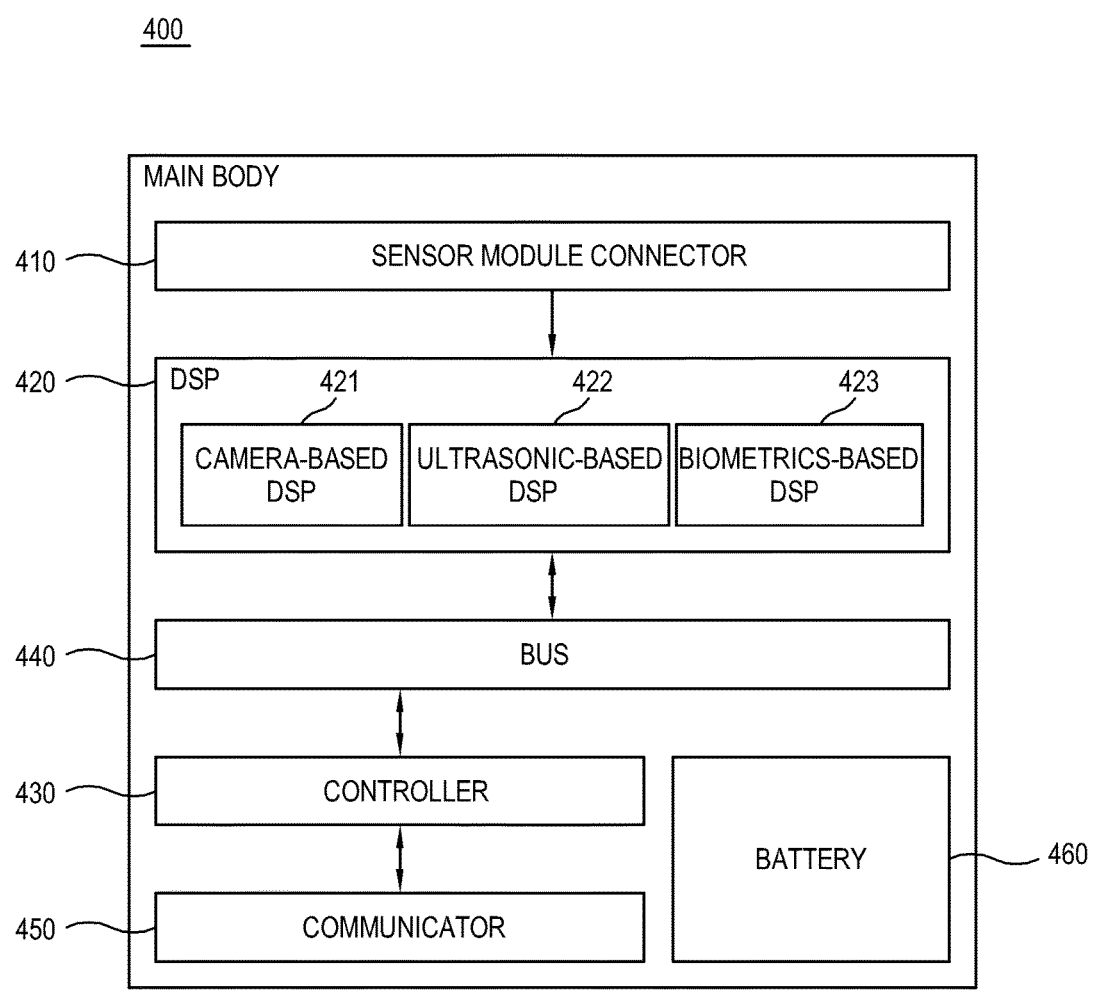
FIG. 4 is a block diagram illustrating an example of the main body in the sensing apparatus according to the second example embodiment.

FIG. 4 is a block diagram illustrating an example main body 400 in the sensing apparatus according to the second example embodiment. The elements of the main body 400 set forth herein are merely an example, and only some related to the present disclosure will be described. Therefore, the main body 400 may additionally include elements not described herein when it is made as a real product, and may be designed differently from the following example embodiment.

As illustrated in FIG. 4, the main body 400 of the sensing apparatus includes a sensor module connector 410 to which the sensor module is connected, a digital signal processor (DSP) 420 which receives and processes a sensing signal from the sensor module through the sensor module connector 410 and generates sensing information, a controller (e.g., including processing circuitry) 430 which performs computation and control for the processing operation of the DSP 420, a bus 440 which is provided as an interface for data exchange between the DSP 420 and the controller 430, a communicator (e.g., including communication circuitry) 450 which transmits the sensing information generated by the DSP 420 to an external host apparatus, and a battery 460 which supplies power for the sensing apparatus.

The sensor module connector 410 allows the sensor module to be connected thereto, and forms a path through which a signal is exchanged between the connected sensor module and main body. That is, the sensor module connector 410 includes the slot 310a (see FIG. 3), and electrically connects with the DSP 420, the controller 430, the battery 460, etc.

The DSP 420 may include various signal processing circuitry, such as, for example, and without limitation, an integrated circuit (IC) for processing a digital signal, and is particularly used for computation of an operating system in real time. The DSP 420 numerically processes a digital signal in accordance with a specific algorithm in order to modify or improve the digital signal as it is previously designed.

The DSP 420 may include various other DSPs, such as, for example, and without limitation, a camera-based DSP 421 corresponding to the sensor module such as the dermatoscope, otoscope, ophthalmoscope, or the like; an ultrasonic-based DSP 422 corresponding to the sensor module such as the ultrasonic transducer, or the like; and a biometrics-based DSP 423 corresponding to the ECG sensor, the PPG sensor, or the like. In this example embodiment, the camera-based DSP 421, the ultrasonic-based DSP 422 and the biometrics-based DSP 423 are integrated into one DSP 420, e.g., a single chip structure, but not limited thereto. Alternatively, the camera-based DSP 421, the ultrasonic-based DSP 422 and the biometrics-based DSP 423 may be individual DSPs 420. In addition to the camera-based DSP 421, the ultrasonic-based DSP 422 and the biometrics-based DSP 423, another DSP may be additionally provided in accordance with supportable sensor modules.

Each of the camera-based DSP 421, the ultrasonic-based DSP 422 and the biometrics-based DSP 423 processes a sensing signal received from the corresponding sensor module. For example, if the sensor module connector 410 outputs a sensing signal in the state that the ultrasonic transducer is mounted to the sensor module connector 410, the sensing signal is processed by the ultrasonic-based DSP 422. Likewise, if the sensor module connector 410 outputs a signal in the state that the ECG sensor is mounted to the sensor module connector 410, the sensing signal is processed by the biometrics-based DSP 423.

The DSP 420 may be individually divided into the camera-based DSP 421, the ultrasonic-based DSP 422 and the biometrics-based DSP 423 in accordance with the kind of sensor module because the characteristics of the sensing signal output from the sensor module are different in accordance with the kinds of sensor module. If characteristics of a sensing signal are different, the DSP 420 for processing the sensing signal has to have corresponding hardware structures. Therefore, in this example embodiment, the DSP 420 may include internal circuits 421, 422 and 423 corresponding to the respective sensor modules, or may include individual DSPs 421, 422 and 423 corresponding to the respective sensor modules.

The controller 430 may include various processing circuitry, such as, for example, and without limitation, a dedicated processor, a central processing unit (CPU) or a microcontroller, or the like, and performs computations needed for controlling the operations of the DSP 420 or processing the DSP 420. Data exchange between the controller 430 and DSP 420 is achieved through the bus 440. The controller 430 activates the DSP 420 to process the sensing signal, and controls power supply from the battery 460. The controller 430 recognizes the kind of sensor module connected to the sensor module connector 410, and selectively transmits a sensing signal from the sensor module connector 410 to one among the camera-based DSP 421, the ultrasonic-based DSP 422 and the biometrics-based DSP 423 in accordance with recognition results.

In accordance with the recognition results, the controller 430 may be designed to selectively activate or inactivate the DSP 420. For example, if it is determined that the sensor module connector 410 does not connect with any sensor module, the controller 430 inactivates all the camera-based DSP 421, the ultrasonic-based DSP 422 and the biometrics-based DSP 423, thereby reducing wasteful power consumption. Of course, it may be possible to keep all the DSPs 420 activated continuously.

If it is determined that the ophthalmoscope is mounted to the sensor module connector 410, the controller 430 activates the camera-based DSP 421 corresponding to the ophthalmoscope so as to process a sensing signal, and inactivates the ultrasonic-based DSP 422 and the biometrics-based DSP 423 which are unnecessary at this point of time. Further, if it is determined that the ultrasonic transducer is mounted to the sensor module connector 410, the controller 430 activates the ultrasonic-based DSP 422 corresponding to the ultrasonic transducer so as to process a sensing signal, and inactivates the camera-based DSP 421 and the biometrics-based DSP 423 which are unnecessary at this point of time. In this manner, the power consumption of the battery 460 is reduced if possible.

The bus 440 is provided in between the controller 430 and the DSP 420 and performs data exchange for computation or control. Since the camera-based DSP 421, the ultrasonic-based DSP 422 and the biometrics-based DSP 423 are different in hardware structure and data transfer protocol from one another, the bus 440 includes architectures respectively corresponding to the DSPs 421, 422 and 423. This means that the DSP 420 and the bus 440 are increased in size and have more complicated structures as more kinds of sensor modules correspond to the DSP 420.

The communicator 450 may include various communication circuitry and transmits the sensing information processed by the DSP 420 to the external host apparatus, so that the host apparatus can display an image based on the sensing information. Further, the communicator 450 may transfer information received from the host apparatus to the controller 430. The communicator 450 may support a wired communication protocol, or may support a wireless communication protocol to easily carry the main body 400.

In the foregoing structure, the DSP 420, the bus 440, the controller 430 and the communicator 450 may be respectively achieved by individual hardware components, or may be integrated in the form of a system on chip (SoC).

Below, operations of sensing an object in a sensing apparatus according to an example embodiment will be described.

Figure 5:
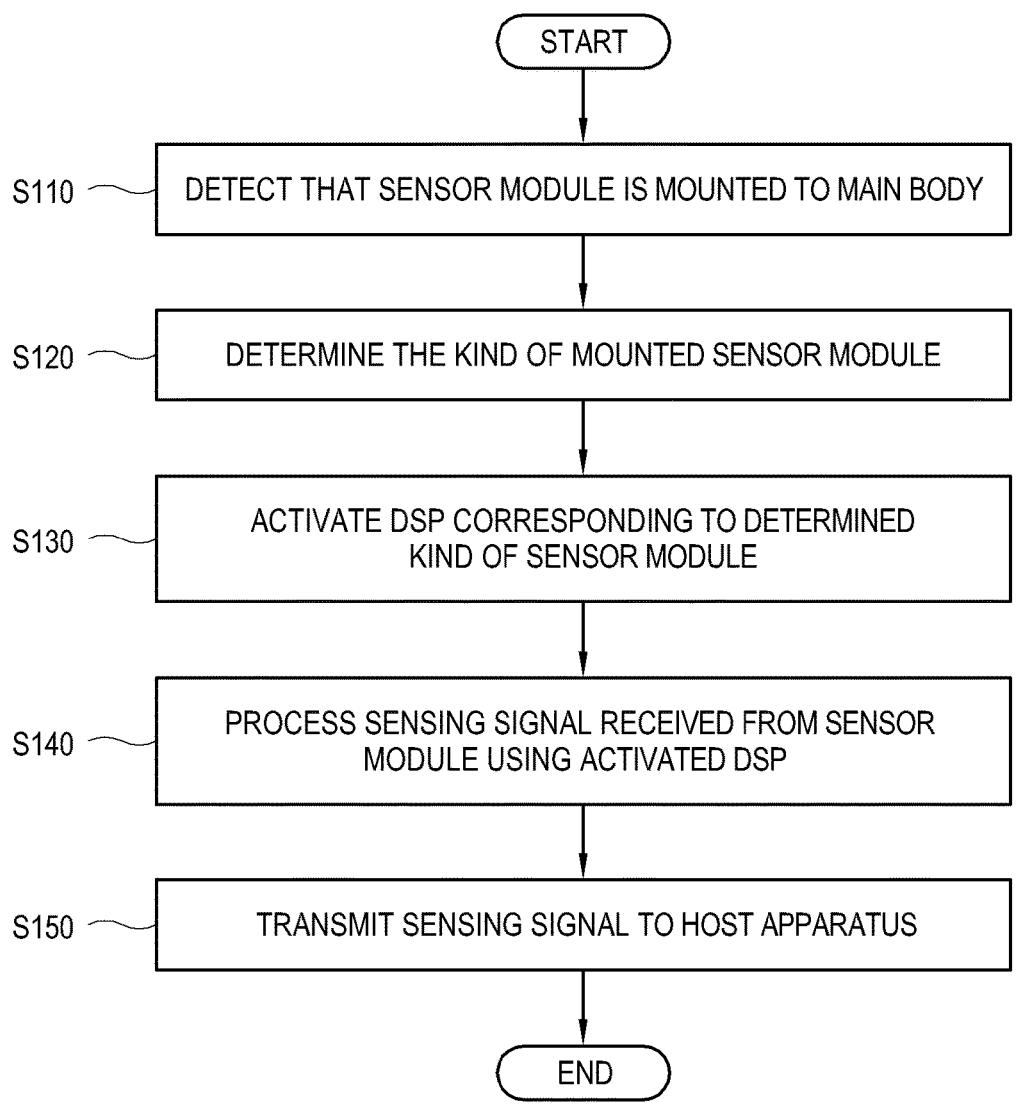
FIG. 5 is a flowchart illustrating an example of sensing an object in the sensing apparatus according to the second example embodiment.

FIG. 5 is a flowchart illustrating an example of sensing an object in the sensing apparatus according to the second example embodiment.

As illustrated in FIG. 5, at operation S110 the sensing apparatus senses that the sensor module is mounted to the main body.

At operation S120 the sensing apparatus determines the kind of sensor module mounted to the main body.

At operation S130 the sensing apparatus activates the DSP corresponding to the determined kind of sensor module.

At operation S140 the sensing apparatus processes a sensing signal received from the sensor module using the activated DSP.

At operation S150 the sensing apparatus sends the host apparatus the sensing information generated by processing the sensing signal, so that the host apparatus can display an image based on the sensing information.

In the second example embodiment, the plurality of sensor modules for sensing respective biological characteristics of an object is selectively mounted to the main body in order to make the sensing apparatus small and lightweight. However, the sensor modules are different in sensing characteristics from one another, and therefore hardware components of the sensor modules and the corresponding DSPs may also be different from one another.

Figure 6:
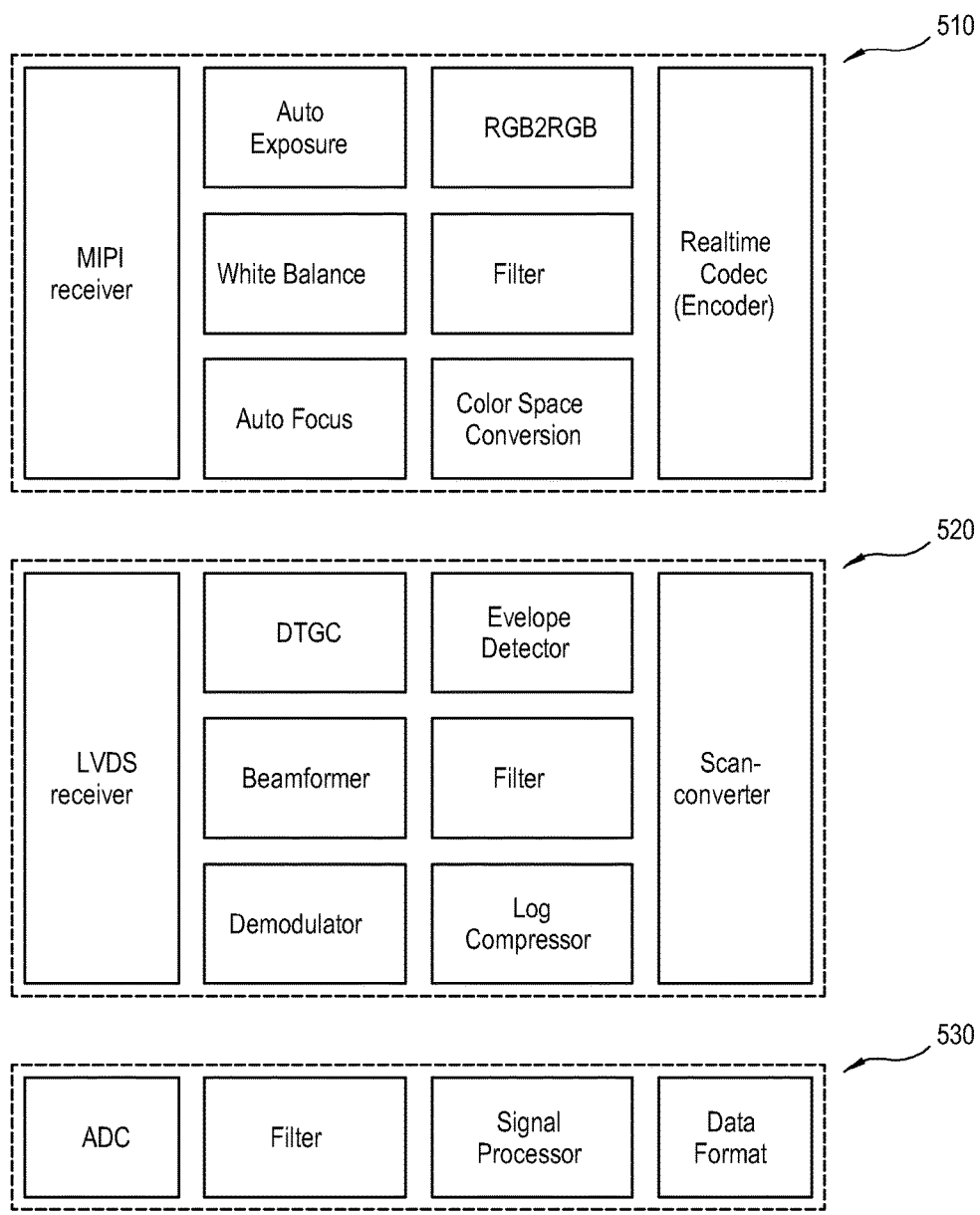
FIG. 6 is a block diagram illustrating example hardware layouts of respective digital signal processors according to the second example embodiment.

FIG. 6 is a block diagram illustrating an example of hardware layouts of respective digital signal processors (DSP) 510, 520 and 530 according to the second example embodiment.

As illustrated in FIG. 6, a camera-based DSP 510, an ultrasonic-based DSP 520 and a biometrics-based DSP 530 are roughly equivalent in receiving and processing a signal, but different in their internal elements and/or structure from one another.

The camera-based DSP 510 includes a mobile industry processor interface (MIPI) receiver for an interface of a mobile device signal, an Auto Exposure for automatically applying proper exposure to an image in accordance with light quantity conditions, a White Balance for generally modifying color intensity, an Auto Focus for automatically adjusting a focus of an image, an RGB2RGB for removing color distortion and getting vivid color, a Filter for filtering a signal to have a specific frequency band, a color space conversion, a Realtime Codec for performing encoding in real time, etc.

The ultrasonic-based DSP 520 includes a low voltage differential (LVDS) receiver for a high-speed digital interface, a digital time gain controller (DTGC) for removing noise, a beam former, a demodulator for demodulating data, an envelope detector for detecting an envelope, a filter, a Log Compressor, a Scan-converter, etc.

The biometrics-based DSP 530 includes an analog-to-digital converter (ADC) for converting an analog signal into a digital signal, a filter, a signal processor, a data format, etc.

Like this, signal processing structures are different from one another in accordance with the sensor modules corresponding to the respective DSPs 510, 520 and 530. Therefore, the main body of the sensing apparatus has to include a DSP corresponding to a sensor module in order to process an sensing signal received from the sensor module. In this example embodiment, the main body includes three DSPs 510, 520 and 530, and thus the main body may have a complicated structure and is increased in size and weight.

Further, in order to add a new sensor module to the sensing apparatus, a DSP corresponding to the new sensor module has to be added to the main body. However, it is difficult to add a new DSP to the small main body, and therefore this example embodiment may be improved in light of extendibility of the sensing apparatus.

Further, if an improved processing method of the DSP is newly proposed in this example embodiment, the old DSP in the main body has to be replaced with a new DSP in order to apply this method to the existing sensing apparatus. Therefore, this example embodiment still may be improved in light of updating a function.

To solve the foregoing problems, the following example embodiment is proposed.

Figure 7:
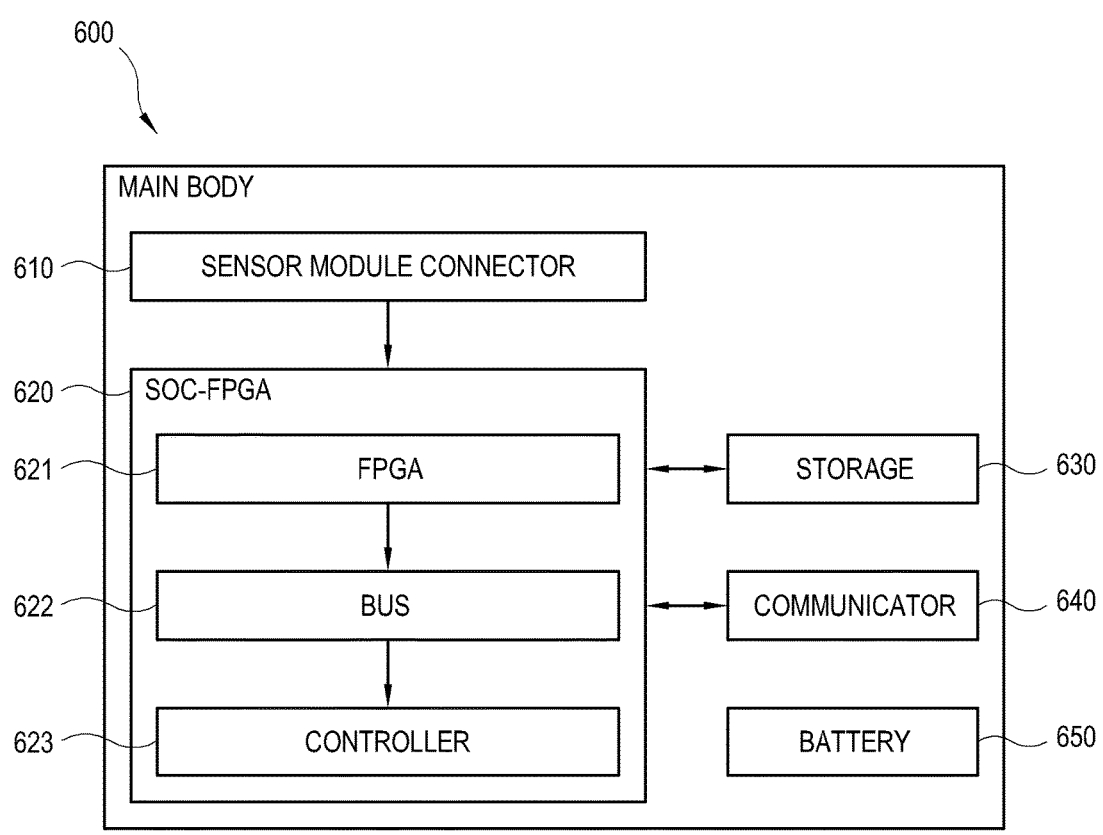
FIG. 7 is a block diagram illustrating an example main body in a sensing apparatus according to a third example embodiment.

FIG. 7 is a block diagram illustrating an example main body in a sensing apparatus according to a third example embodiment;

As illustrated in FIG. 7, the main body 600 of the sensing apparatus according to the third example embodiment includes a sensor module connector 610 to which the sensor module is mounted, an SOC-FPGA 620 which generates sensing information by processing a sensing signal received from the sensor module, a storage 630 which stores data, a communicator (e.g., including communication circuitry) 640 which communicates with a host apparatus to transmit the sensing information to the host apparatus, and a battery 650 which supplies power to the sensing apparatus.

Among these elements, the sensor module connector 610, the communicator 640 and the battery 650 are equivalent to those described with reference to the second example embodiment, and thus repetitive descriptions will be avoided.

The SOC-FPGA 620 is achieved by integrating a field programmable gate array (FPGA) 621, a bus 622 and a controller 623 into one SOC. Alternatively, the FPGA 621, the bus 622 and the controller 623 may be designed as individual elements instead of the SOC-FPGA 620. The FPGA 621 plays a role of the DSP in the second example embodiment, and the bus 622 and the controller 623 are the same as those of the second example embodiment.

The FPGA 621 may be achieved by a semiconductor device that includes a programmable logic element and a programmable internal wiring-line. The programmable logic element, e.g., a logic block may be programmed by copying a function of a basic logic gate, such as AND, OR, XOR, NOT, or a combination function of more complicated decoder or calculation functions. The FPGA 621 includes a flip-flop, a memory element, etc. in addition to the logic block.

The programmable internal wiring-line internally connects the logic blocks in accordance with demands of a system designer. Since the logic block and the internal wiring-line are programmable by a user after the FPGA 621 is manufactured, any logic function is possible.

On the contrary to an application specific integrated circuit (ASIC), the FPGA 621 is a silicon chip in which resetting or reprogramming is possible. The FPGA 621 includes a previously established logic block and a programmable routing resource, and is thus provided as a chip for executing a customized hardware function without using a breadboard or a soldering iron. In the FPGA 621, the resetting may be implemented as an image of a circuit to be reset is loaded into the FPGA 621 and re-compiled and then the FPGA 621 is initialized.

Here, the image of the circuit refers to a data image for realizing hardware components of the circuit, or a hardware layout of the circuit. In light of data for changing the hardware design of the FPGA 621, the image of the circuit image may be regarded as data for realizing virtual hardware.

Like this, the FPGA 621 may be fully recomposed. When the FPGA 621 is recompiled by another circuit image, it immediately has a characteristic of a new circuit. A circuit image for resetting the FPGA 621 has been developed by techniques of converting a graphic-based block diagram or an ANSI-C code into a digital hardware circuit in accordance with introduction of a high-level design tool.

The FPGA 621 has the same flexibility as software to be executed in the processor-based system, and is not limited to the number of available processing cores. The FPGA 621 has a parallel structure in itself, and does not have to occupy one resource occupied with another processing work. Each independent processing task is assigned to a dedicated section of the FPGA 621, and performs its function independently of another logic block. In result, performance of a certain part of an application is not affected in the FPGA 621 even though more processes are added. This means that multitasking is possible by a plurality of processes as long as it is allowed by the resource of the FPGA 621.

With this structure, the controller 623 of the sensing apparatus according to this example embodiment determines the kind of sensor module if it is sensed that the sensor module is coupled to the sensor module connector 610. The controller 623 acquires a circuit setting layout of the DSP corresponding to the determined kind of sensor module, e.g., a hardware image of the DSP, and resets an internal circuit structure of the FPGA 621 in accordance with the acquired hardware image. Thus, the FPGA 621 can operate as a DSP corresponding to the sensor module mounted to the main body 600.

In addition, the controller 623 acquires an architecture image of the bus 622 as well as the hardware image of the DSP, and resets the bus 622 in accordance with the acquired architectures of the bus 622. Since the circuit structure of the FPGA 621 is changed by the hardware image of the DSP, the bus 622 has to be also set corresponding to the changed circuit structure of the FPGA 621 so that the FPGA 621 can communicate with the controller 623.

Here, the controller 623 determines the kind of sensor module, but the present disclosure is not limited thereto. The controller 623 may specify the sensor module based on various pieces of identification information prepared for distinguishing between the currently mounted sensor module and another sensor module, such as an identification name, an identification number, a model name, etc. of the sensor module.

Figure 8:
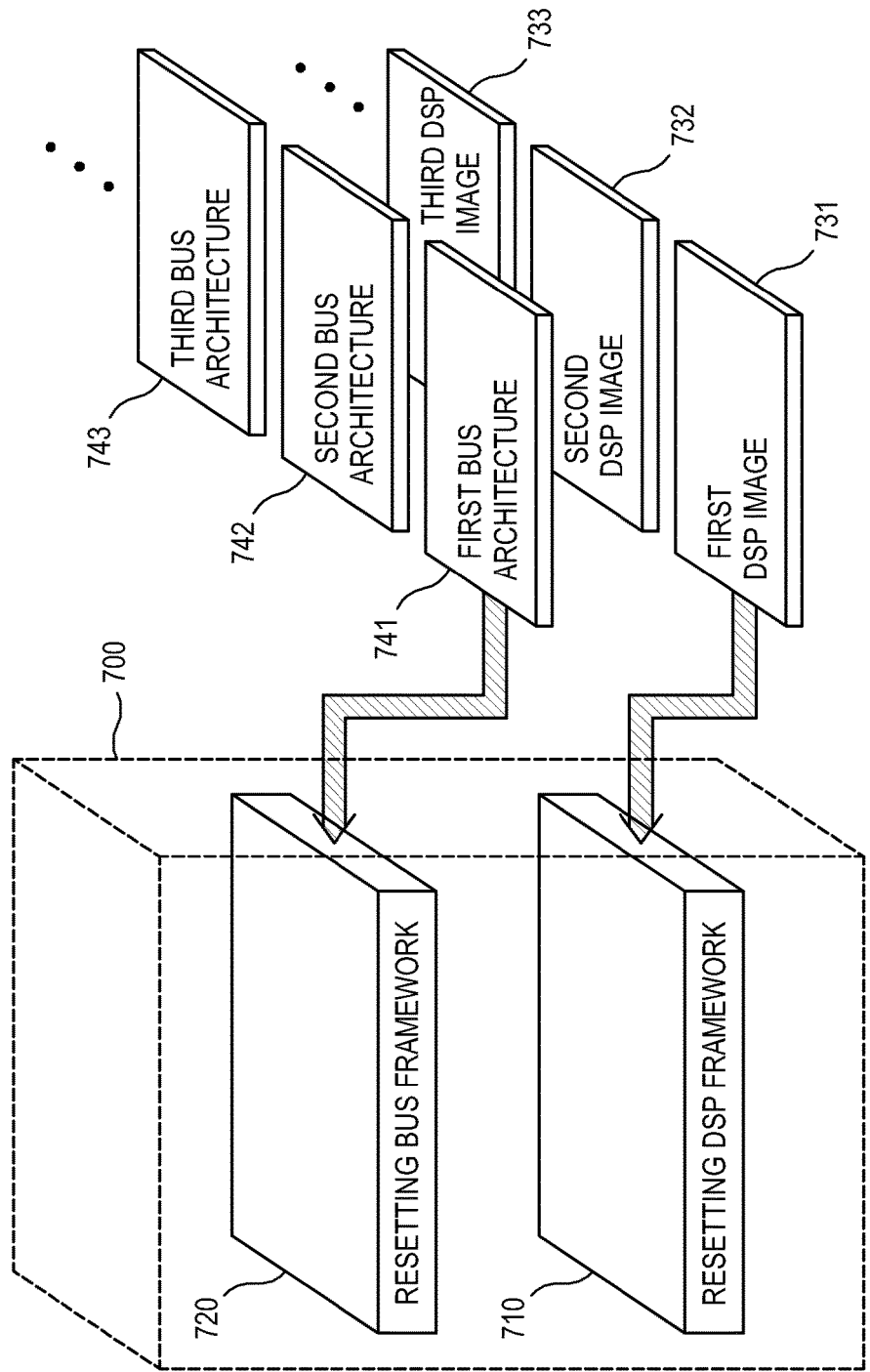
FIG. 8 is a diagram illustrating an example principle of operating the sensing apparatus according to the third example embodiment.

FIG. 8 is a diagram illustrating an example principle of operating the sensing apparatus according to the third example embodiment.

As illustrated in FIG. 8, a sensing apparatus 700 includes a resetting DSP framework 710 and a resetting bus framework 720 in order to reset the FPGA.

A framework basically refers to an assembly of libraries and classes for realizing a standard structure of an application for a certain operating system in programming. The framework combines codes reusable or shared in various applications into a standard code, so that the application can operate without including all the standard codes. The framework allows a unique class of an application using an object-oriented programming technique to inherit the existing class of the framework. If the application is written to be executable on the framework, the application does not have to include the standard codes designated in the framework in itself. Further, the framework operates like a kind of middleware, and thus serves as an interface between operating systems or hardware components when the application is executed.

The sensing apparatus 700 selects one among many previously prepared DSP images 731, 732 and 733 and one among bus architectures 741, 742 and 743, in accordance with the sensor module mounted to the main body. The sensing apparatus 700 loads the resetting DSP framework 710 and the resetting bus framework 720 with the selected DSP image 731, 732 or 733 and the bus architecture 741, 742 or 743, respectively.

Here, the DSP images 731, 732 and 733 refer to the circuit layouts or hardware images of the DSP among the camera-based DSP 510 (see FIG. 6), the ultrasonic-based DSP 520 (see FIG. 6) and the biometrics-based DSP 530 (see FIG. 6) described as above. Further, the bus architectures 741, 742 and 743 refer to circuit layouts of the buses corresponding to the hardware images, respectively.

If the resetting DSP framework 710 is for example loaded with a certain DSP image 731, the sensing apparatus 700 resets the FPGA as designated in the DSP image 731. Further, the sensing apparatus 700 resets the bus in accordance with the bus architecture 741 loaded on the resetting bus framework 720. Thus, the FPGA is reset corresponding to the sensor module mounted to the main body.

As the DSP image 731, 732 or 733 and the bus architecture 741, 742 or 743 are loaded to the framework 710 or 720, it is as effective as the hardware component is replaced in the sensing apparatus 700. In this regard, the resetting DSP framework 710 and the resetting bus framework 720 serve as a kind of virtual hardware device drivers.

Below, it will be described in detail how the sensing apparatus 700 determines the kind of sensor module mounted to the main body. There may be various methods of determining the kind of sensor module, for example, a strap option method, a method of accessing a register of the sensor module and acquiring information, a method of requesting information to a microcontroller of the sensor module, etc.

Figure 9:
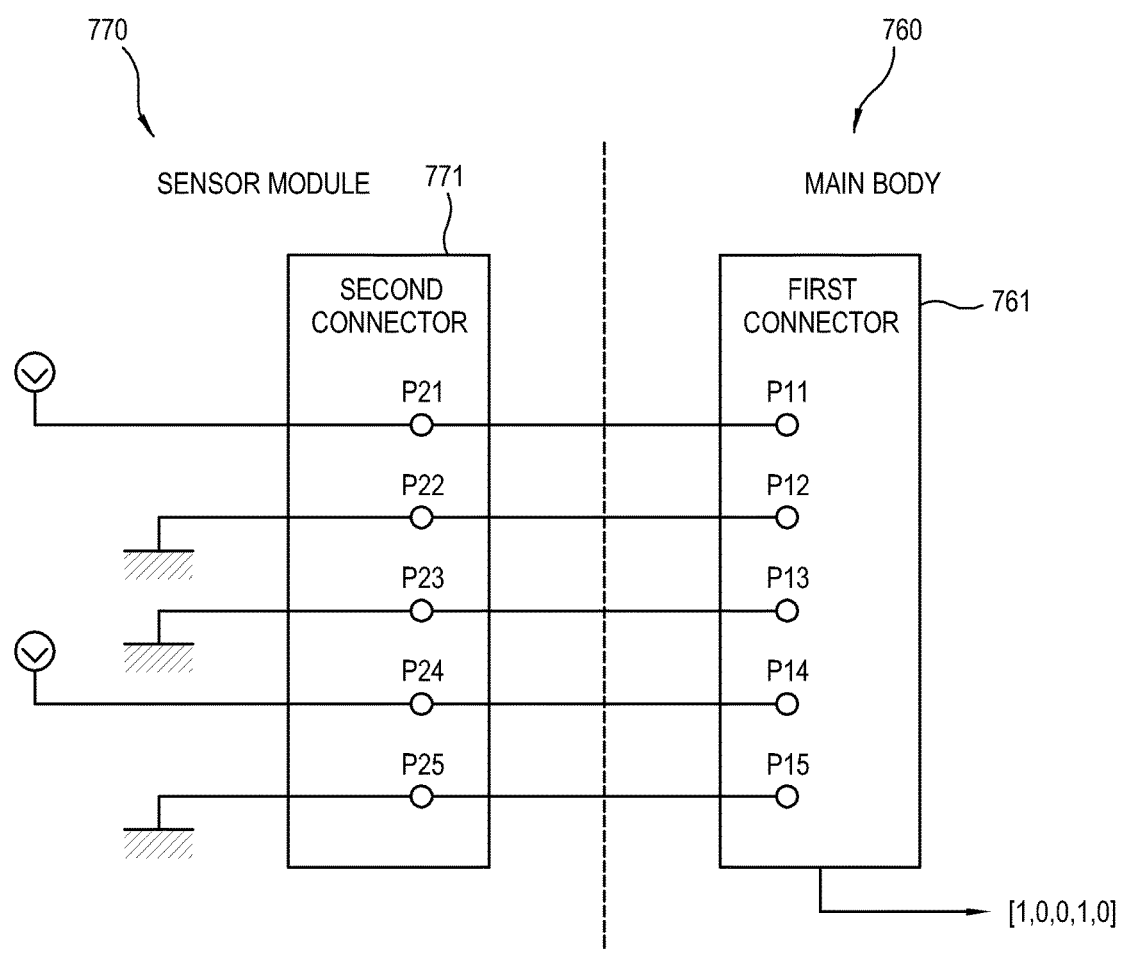
FIG. 9 is a diagram illustrating example connections of some terminals between a main body and a sensor module in a sensing apparatus according to a fourth example embodiment.

FIG. 9 is a diagram illustrating an example showing connections of some terminals between a main body 760 and a sensor module 770 in a sensing apparatus according to a fourth example embodiment.

As illustrated in FIG. 9, when the main body 760 and the sensor module 770 of the sensing apparatus according to the fourth example embodiment are connected to each other, a first connector 761 of the main body 760 and a second connector 771 of the sensor module 770 are also electrically connected to each other. Each of the first connector 761 and the second connector 771 include a plurality of terminals or pins. Five pins P11, P12, P13, P14 and P15 of the first connector 761 are one-to-one connected to five pins P21, P22, P23, P24 and P25 of the second connector 771, respectively Among the five pins of the second connector 771, some are connected to a predetermined voltage, and the others are connected to the ground. Alternatively, all the five pins may be connected to a predetermined voltage, or all the five pins may be connected to the ground. However, in accordance with the kinds of sensor module, such five pins may be different in connection type. Further, some of the five pins may be provided to apply a high signal, and the others may be provided to apply a low signal.

For example, among the five pins of the second connector 771, the pins P21 and P24 are connected to a voltage, but the pins P22, P23, P25 are connected to the ground. In this state, if the sensor module 770 is connected to the main body 760, the pins of the second connector 771 are also connected to the pins of the first connector 761.

Thus, the pins of the first connector 761 detect different signals in accordance with the connection types of the five pins of the second connector 771. That is, a value of '1' is detected in the pins P11 and P14 respectively connected to the pins P21, P24 connected to a voltage, but a value of '0' is detected in the pins P12, P13, P15 respectively connected to the pins P22, P23, P25 connected to the ground. In result, the first connector 761 outputs a signal having information of [1,0,0,1,0].

If the five pins of the second connector 771 are all connected to a voltage, the first connector 761 outputs a signal having information of [1,1,1,1,1]. On the other hand, if the five pins of the second connector 771 are all connected to the ground, the first connector 761 outputs a signal having information of [0,0,0,0,0].

The sensing apparatus determines the kind of sensor module currently mounted to the main body based on the information output from the first connector 761. This method is called the strap option method.

FIG. 10 is a diagram illustrating an example of a DB 770 provided for determining the kind of sensor module in the sensing apparatus according to the fourth example embodiment;

As illustrated in FIG. 10, the sensing apparatus retrieves a previously stored DB 770 with information of a signal output from the first connector 761 (see FIG. 9). The DB 770 is previously prepared and stored in the sensing apparatus.

In the DB 770, identification information of a signal output from the pins when the sensor module and the main body are coupled, and the kind of sensor module corresponding to each piece of the identification information are designated in accordance with the foregoing strap option methods. For example, based on the DB 770, the sensing apparatus determines that the sensor module is the ophthalmoscope if the identification is [0,0,0,1,1], and determines that the sensor module is the PPG sensor if the identification is [0,0,1,0,1].

In this manner, the sensing apparatus can easily determine the kind of sensor module mounted to the main body.

Figure 11:
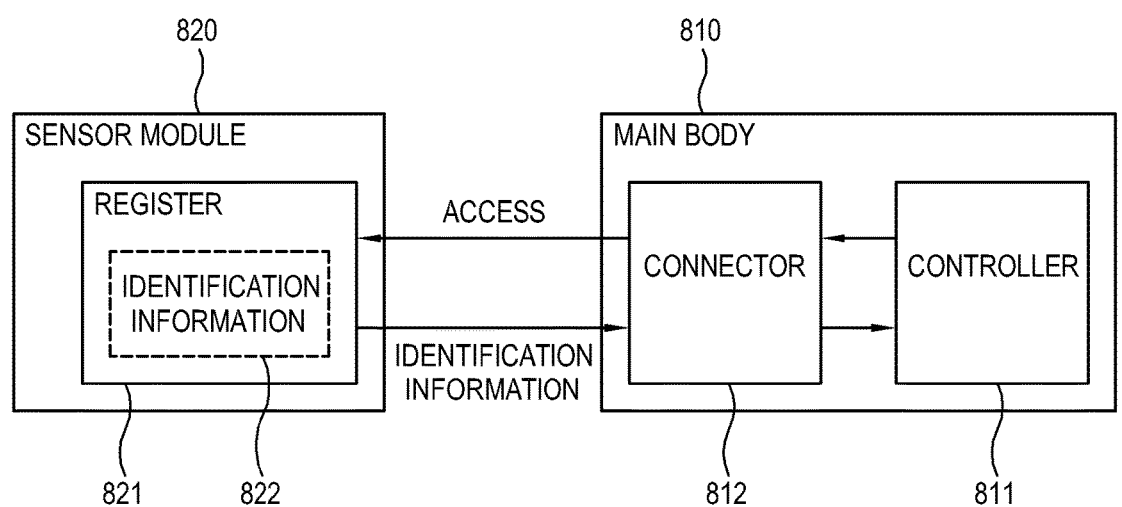
FIG. 11 is a diagram illustrating an example principle of determining the kind of sensor module in a sensing apparatus according to a fifth example embodiment.

FIG. 11 is a diagram illustrating an example principle of determining the kind of sensor module in a sensing apparatus according to a fifth example embodiment;

As illustrated in FIG. 11, if it is determined that the sensor module 820 is mounted to the connector 812, a controller 811 of a main body 810 of the sensing apparatus according to the fifth example embodiment accesses a register 821 of the sensor module 820 through the connector 812. The sensor module 820 includes the register 821, and the register 821 stores information related to the sensor module 820 as well as the identification information 822 of the sensor module 820. The register 821 is achieved by various non-volatile memories capable of preserving data. For example, the register 821 may be achieved by a read only memory (ROM) to prevent data from being damaged.

The controller 811 accesses the register 821 and acquires the identification information 822 stored in the register 821. Here, the controller 811 may previously determine an address at which the identification information 822 is stored, in order to access the register 821 and acquire the identification information 822. When it is sensed for the first time that the sensor module 820 is mounted to the main body 810, the controller 811 does not know the kind of sensor module 820. Thus, such addresses are given equally even though the kinds of sensor module 820 are different.

If the identification information 822 is acquired from the register 821, the controller 811 can determine the kind of sensor module 820 based on the identification information 822.

Figure 12:
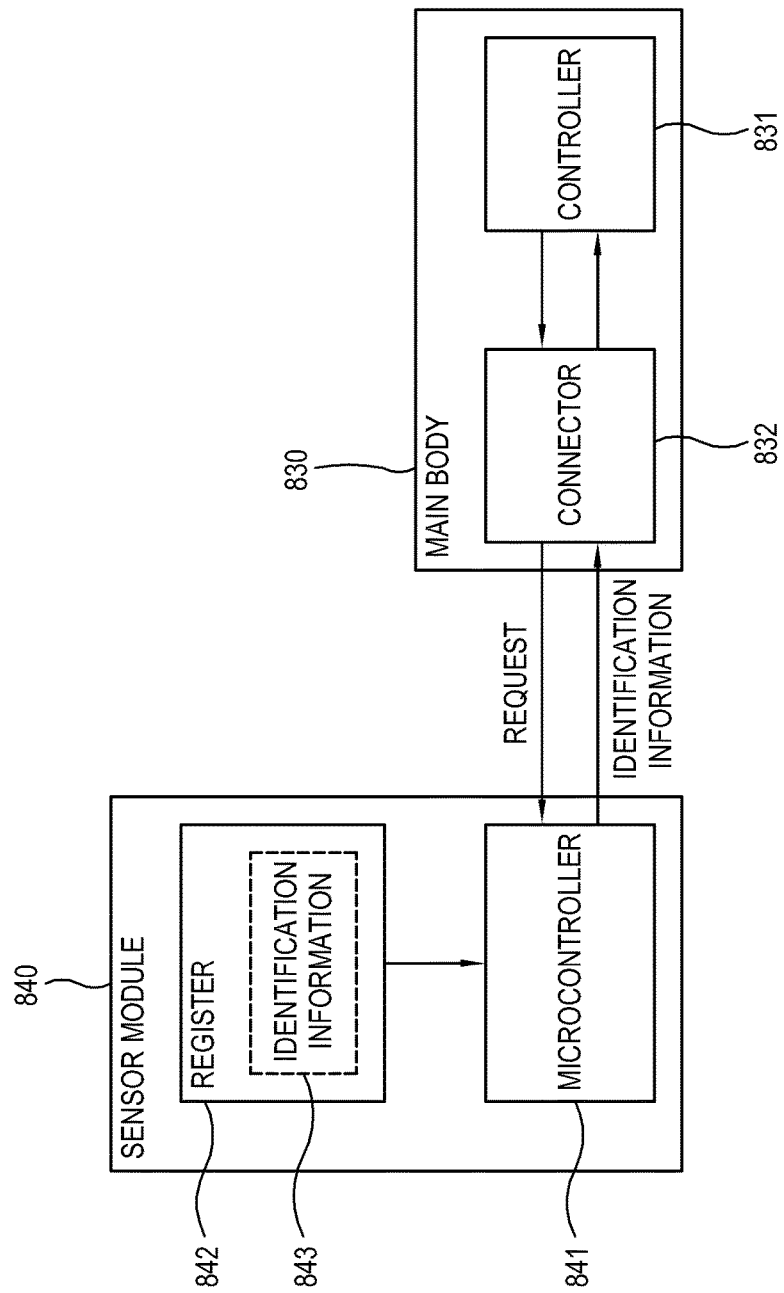
FIG. 12 is a diagram illustrating an example principle of determining the kind of sensor module in a sensing apparatus according to a sixth example embodiment.

FIG. 12 is a diagram illustrating an example principle of determining the kind of sensor module in a sensing apparatus according to a sixth example embodiment.

As illustrated in FIG. 12, if it is determined that a sensor module 840 is mounted to a connector 832, a controller 831 of a main body 830 of the sensing apparatus according to the sixth example embodiment makes a request for identification information 843 to the sensor module 840 through the connector 832. The sensor module 840 includes a simple microcontroller 841, and uses the microcontroller 841 to process a request signal from the main body 830. Further, the sensor module 840 includes a register 842 that stores the identification information 843.

The microcontroller 841 transmits the identification information 843 stored in the register 842 to the main body 830 in response to the request from the main body 830. The controller 831 may determine information of the sensor module 840 based on the identification information 843 received from the sensor module 840.

This embodiment is different from the foregoing fifth example embodiment (see FIG. 11) as follows. In the case of the fifth example embodiment, the controller of the main body directly acquires the identification information from the register of the sensor module, and therefore needs to previously know the address of the identification information. However, according to the fifth example embodiment, the sensor module does not have to include a built-in microcontroller.

On the other hand, in the sixth example embodiment, the controller 831 just makes a request for the identification information 843 to the microcontroller 841 without previously determining the address of the identification information 843. However, in this case, the sensor module 840 includes the built-in microcontroller 841 to acquire the identification information 843 and transmit it to the main body 830.

Through various methods as described above, the sensing apparatus determines the kind of sensor module currently mounted to the main body. When the kind of sensor module is specified, the sensing apparatus acquires a data image of a DSP and an architecture of a bus corresponding to the specified kind of sensor module.

The sensing apparatus acquires a data image of a DSP and an architecture of a bus from its own storage or a host apparatus, embodiments of which will be described later.

Figure 13:
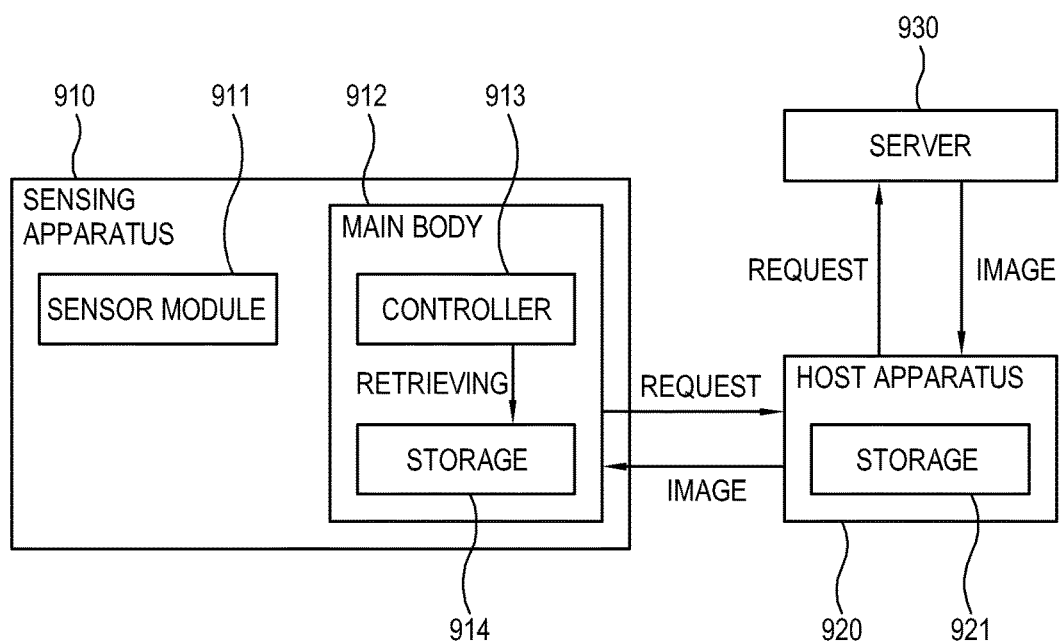
FIG. 13 is a diagram illustrating an example principle of acquiring a hardware image of a DSP in a sensing apparatus according to a seventh example embodiment.

FIG. 13 is a diagram illustrating an example principle of acquiring a hardware image of a DSP in a sensing apparatus according to a seventh example embodiment.

As illustrated in FIG. 13, a controller 913 of a main body 912 of the sensing apparatus according to the seventh example embodiment determines the kind of sensor module 911 currently mounted to the main body 912 when a preset trigger event occurs. Here, the trigger event refers to an event for instructing the controller 913 to start determining the kind of sensor module 911. For example, the trigger event may include an event of turning on the main body 912. Further, if the main body 912 supports hot-plugging, the trigger event may include an event of sensing that the sensor module 911 is newly mounted to the main body 912.

If the kind of sensor module 911 is specified, the controller 913 retrieves a hardware image of a DSP corresponding to the specified kind from a storage 914. If the hardware image of the DSP corresponding to the sensor module 911 is retrieved in the storage 914, the controller 913 calls the retrieved mage and resets the FPGA.

On the other hand, if the hardware image of the DSP corresponding to the sensor module 911 is not retrieved from the storage 914, the controller 913 makes a request for the hardware image of the DSP to a host apparatus 920. Of course, if the main body 912 does not include the storage 914 in itself, the controller 913 may directly make a request for a hardware image of a DSP to the host apparatus 920 at a point of time when the kind of sensor module 911 is specified.

The host apparatus 920 retrieves the hardware image of the DSP from its own storage 921 in response to the request from a sensing apparatus 910. If the hardware image of the DSP is retrieved in the storage 921, the host apparatus 920 transmits the retrieved hardware image of the DSP to the sensing apparatus 910. On the other hand, if the hardware image of the DSP is not retrieved in the storage 921, the host apparatus 920 makes a request for the hardware image of the DSP to a server 930.

If it is previously set that the hardware image of the DSP is not stored in the storage 921 of the host apparatus 920, the host apparatus 920 may directly make a request for the hardware image of the DSP to the server 930 without searching the storage 921.

In response to the request from the host apparatus 920, the server 930 retrieves many hardware images of the DSPs stored therein or stored in another device (not shown), and transmits the retrieved hardware image of the DSP to the host apparatus 920. Of course, if the hardware image of the DSP is not retrieved in response to the request, the server 930 notifies the host apparatus 920 of the retrieving results. The host apparatus 920 transmits notification from the server 930 to the sensing apparatus 910. If the hardware image of the DSP corresponding to the request is received from the server 930, the host apparatus 920 transmits it to the sensing apparatus 910.

When the sensing apparatus 910 receives the hardware image of the DSP from the host apparatus 920, the FPGA is reset in accordance with the hardware image of the DSP and stores the hardware image of the DSP in the storage 914. Thus, the controller 913 can easily acquire the hardware image of the DSP from the storage 914 when the controller 913 needs the same hardware image of the DSP in the future.

In accordance with such a method, the sensing apparatus 910 acquires the hardware image of the DSP corresponding to the kind of sensor module 911 mounted to the main body 912. Likewise, the sensing apparatus 910 may further acquire the bus architecture corresponding to the kind of sensor module 911.

In this example embodiment, the controller 913 first searches the storage 914 and then makes a request to the host apparatus 920 in order to acquire the hardware image of the DSP, but not limited to this order. Further, the host apparatus 920 first searches the storage 921 in response to the request from the sensing apparatus 910 and then makes a request to the server 930, but not limited to this order.

Below, operations of the sensing apparatus will be described in order.

Figure 14:
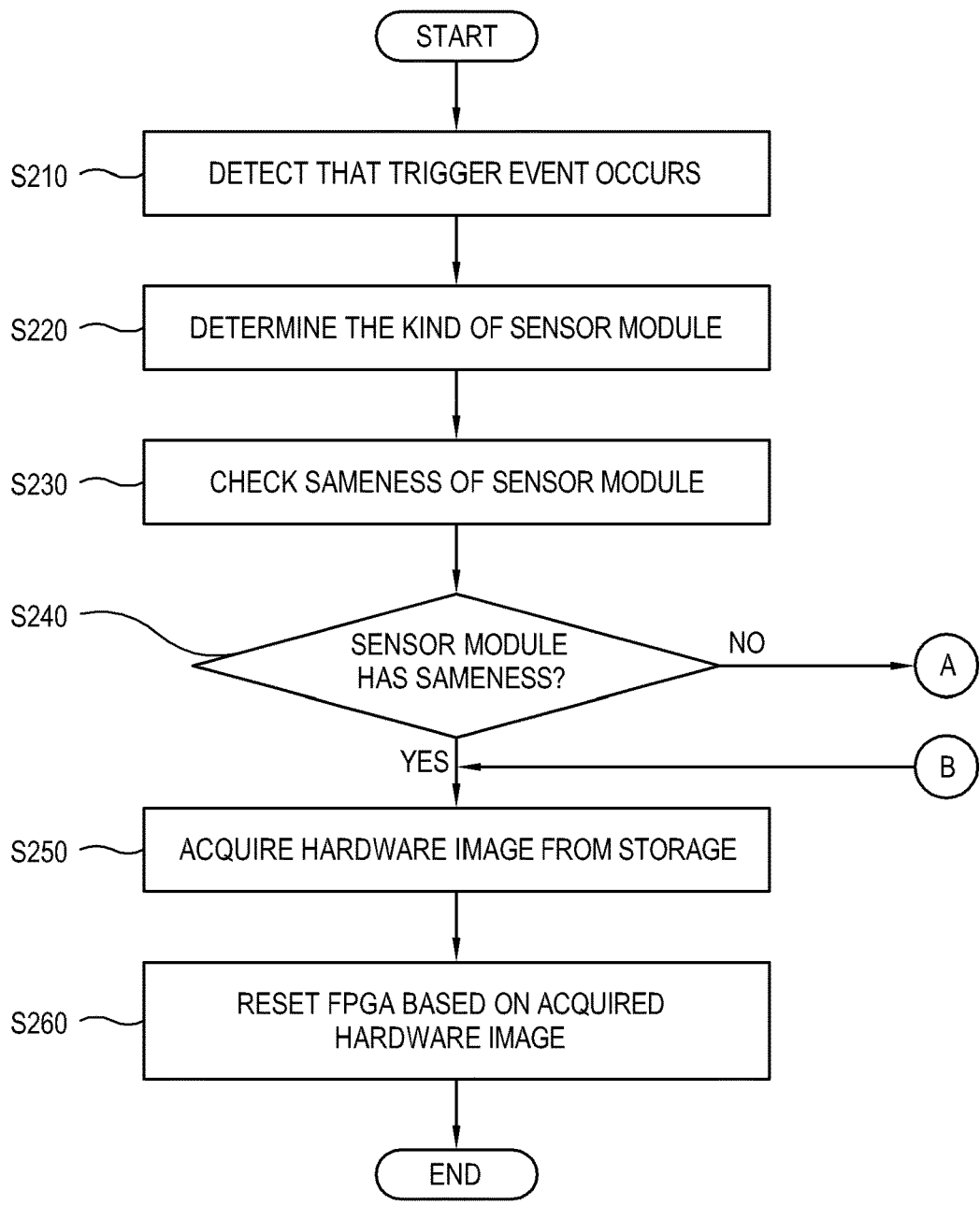
FIG. 14 and FIG. 15 are a flowchart illustrating an example of resetting an FPGA corresponding to a sensor module in the sensing apparatus according to the seventh example embodiment.
Figure 15:
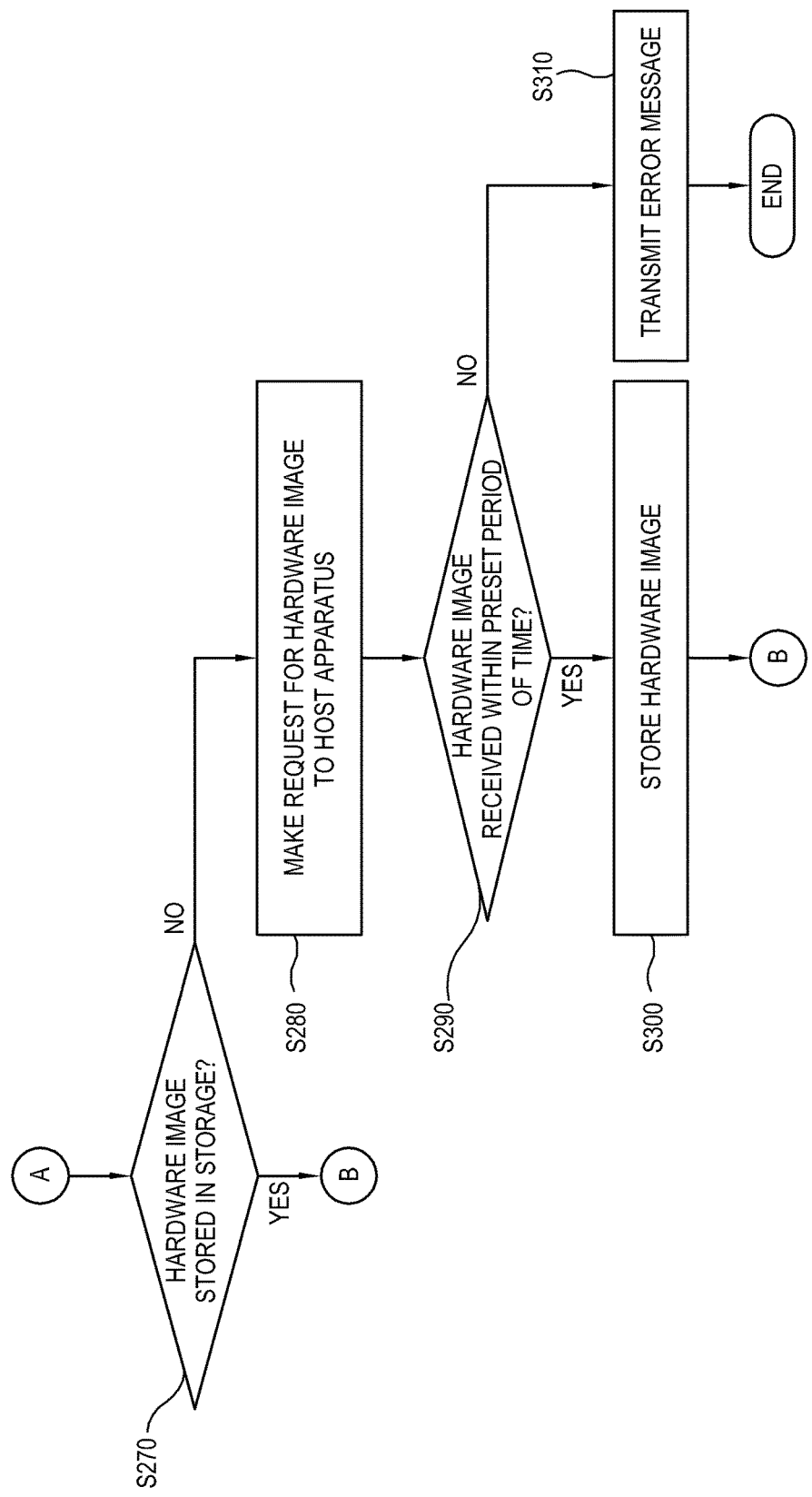

FIG. 14 and FIG. 15 are a flowchart illustrating an example of resetting an FPGA corresponding to a sensor module in the sensing apparatus according to the seventh example embodiment;

As illustrated in FIG. 14, at operation S210 the sensing apparatus detects that a trigger event occurs. The trigger event is equivalent to that described with reference to FIG. 13.

At operation S220 the sensing apparatus determines the kind of sensor module currently mounted to the main body.

At operation S230 the sensing apparatus checks the sameness of the sensor module based on a history of using the sensor module previously registered to the sensing apparatus. Here, the sameness shows whether the currently mounted sensor module has been previously used in the sensing apparatus, e.g., whether there is a history of using the currently mounted sensor module. If the sensor module has the sameness, it means that the hardware image of the DSP corresponding to the sensor module is present in the storage of the sensing apparatus, and normal operations of the sensor module have been proved in the sensing apparatus.

At operation S240 the sensing apparatus determines whether the sensor module has the sameness.

If it is determined that the sensor module has the sameness, at operation S250 the sensing apparatus acquires the hardware image of the DSP from its own storage. At operation S260 the sensing apparatus resets the FPGA in accordance with the hardware image of the DSP.

As illustrated in FIG. 15, if it is determined at operation S240 (see FIG. 14) that the sensor module does not have the sameness, at operation S270 the sensing apparatus retrieves the hardware image of the DSP corresponding to the sensor module from its own storage. If the hardware image of the DSP is retrieved from the storage, the sensing apparatus moves to the operation S250 (see FIG. 14).

On the other hand, if the hardware image of the DSP is not retrieved from the storage, at operation S280 the sensing apparatus makes a request for the hardware image of the DSP to the host apparatus. At operation S290 the sensing apparatus determines whether the hardware image of the DSP is received from the host apparatus within a preset period of time.

If it is determined that the hardware image of the DSP is received from the host apparatus within a preset period of time, at operation S300 the sensing apparatus stores the hardware image of the DSP received from the host apparatus in the storage, and moves to the operation S250 (see FIG. 14).

On the other hand, if it is determined that the hardware image of the DSP is not received from the host apparatus within a preset period of time, at operation S310 the sensing apparatus sends an error message to the host apparatus so that the error message can be displayed on the host apparatus. In addition, if the sensing apparatus has a small display panel, it can display the error message by itself. Further, the sensing apparatus may inform a user of an error through its own loudspeaker.

In this manner, the sensing apparatus resets and uses the FPGA in accordance with the kinds of sensor module.

Below, a method of reflecting the present disclosure will be schematically described with representations different from those of the foregoing embodiments.

Figure 16:
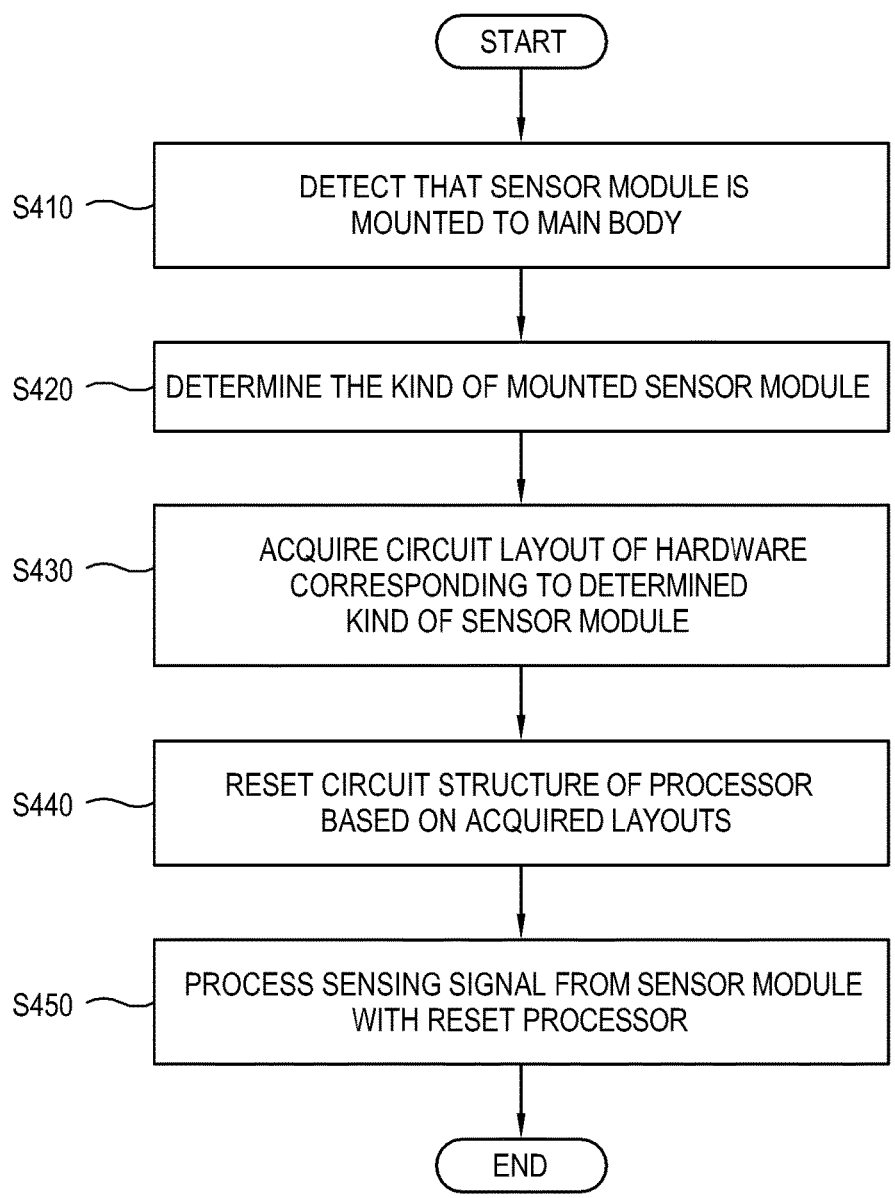
FIG. 16 is a flowchart illustrating an example of resetting internal hardware corresponding to the kind of sensor module in a sensing apparatus according to an eighth example embodiment.

FIG. 16 is a flowchart illustrating an example of resetting internal hardware corresponding to the kind of sensor module in a sensing apparatus according to an eighth example embodiment;

As illustrated in FIG. 16, at operation S410 the sensing apparatus detects that the sensor module is mounted to the main body.

At operation S420 the sensing apparatus determines the kind of mounted sensor module.

At operation S430 the sensing apparatus acquires the hardware layout corresponding to the determined kind of sensor module.

At operation S440 the sensing apparatus resets the circuit structure of the internal processor based on the acquired layout.

At operation S450 the sensing apparatus processes the sensing signal received from the sensor module through the reset internal processor.

The hardware image previously stored in the sensing apparatus may be updated. This updating may be executed by the host apparatus or the sensing apparatus itself.

Figure 17:
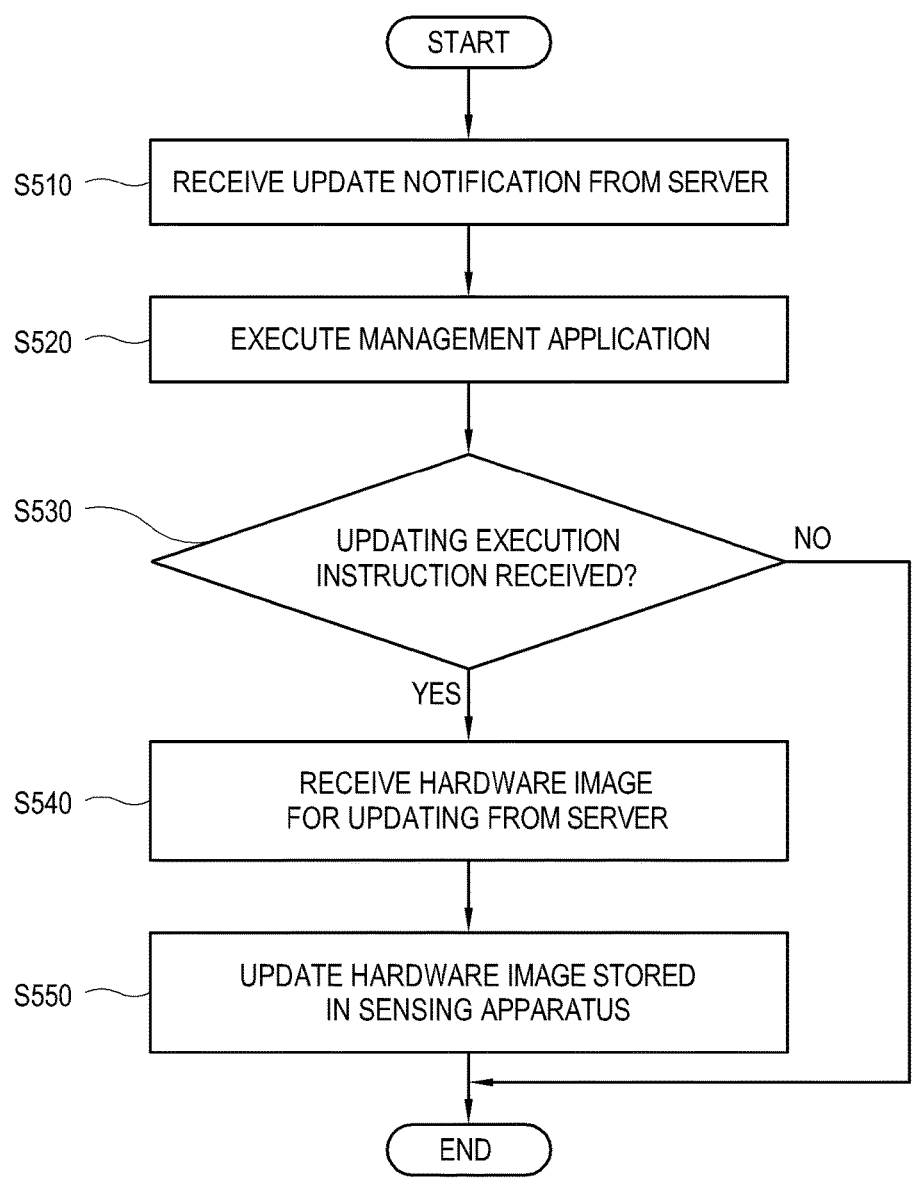
FIG. 17 is a flowchart illustrating an example of updating a hardware image stored in a sensing apparatus by a host apparatus according to a ninth example embodiment.

FIG. 17 is a flowchart illustrating an example of updating a hardware image stored in a sensing apparatus by a host apparatus according to a ninth example embodiment.

As illustrated in FIG. 17, at operation S510 the host apparatus receives an update notification from a server. Such an update notification is transmitted by a push notification for sending a message from the server to a client. In this example embodiment, presuppose that the push notification is activated in the host apparatus.

At operation S520 the host apparatus executes a management application prepared for managing the sensing apparatus. The host apparatus may display a user interface (UI) for receiving an input, such as, for example, a user's input, as the management application is executed.

At operation S530 the host apparatus determines whether an updating execution instruction is received through the UI of the management application.

If the updating execution instruction is received, at operation S540 the host apparatus receives a hardware image to be updated from the server. Here, it may be determined by the management application which one among the hardware images stored in the sensing apparatus will be updated.

At operation S550 the host apparatus accesses the sensing apparatus, and updates the hardware image stored in the sensing apparatus with a new hardware image received from the server. Such an updating method may be achieved in such a manner that the host apparatus uses the management application to update the sensing apparatus or the host apparatus just transmits the hardware image to the sensing apparatus so that the sensing apparatus can perform updating by itself.

On the other hand, if the updating execution instruction input is not received, the host apparatus may terminate the management application or do not perform any following operations.

If the push notification is not activated in the host apparatus, updating is performed in a little different way.

Figure 18:
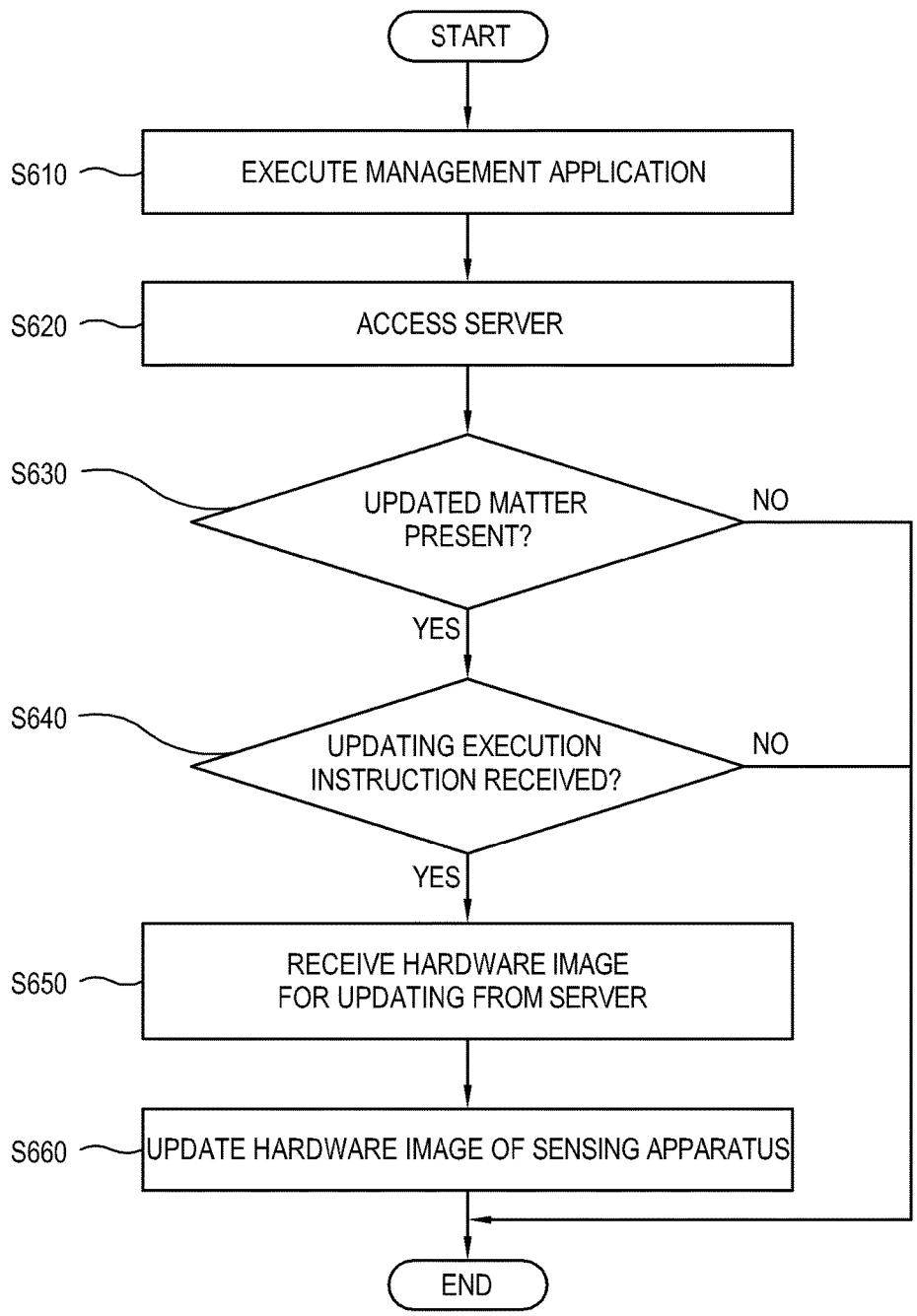
FIG. 18 is a flowchart illustrating an example of updating a hardware image stored in a sensing apparatus by a host apparatus according to a tenth example embodiment.

FIG. 18 is a flowchart illustrating an example of updating a hardware image stored in a sensing apparatus by a host apparatus according to a tenth example embodiment.

As illustrated in FIG. 18, at operation S610 the host apparatus executes the management application in response to a predetermined event. Such an event may be for example based on a user's instruction for executing the application or a schedule for executing the application.

At operation S620 the host apparatus accesses the server. At operation S630 the host apparatus determines whether updated matters are present in the hardware image stored in the sensing apparatus.

If it is determined that the updated matters are present, at operation S640 the host apparatus determines whether an updating execution instruction is received through the UI of the management application.

When the updating execution instruction is received, at operation S650 the host apparatus receives an hardware image to be updated from the server.

At operation S660 the host apparatus accesses the sensing apparatus, and updates the hardware image stored in the sensing apparatus with a new hardware image received from the server.

In addition, if the sensing apparatus is capable of communicating with the server, it can do updating independently of the host apparatus.

Figure 19:
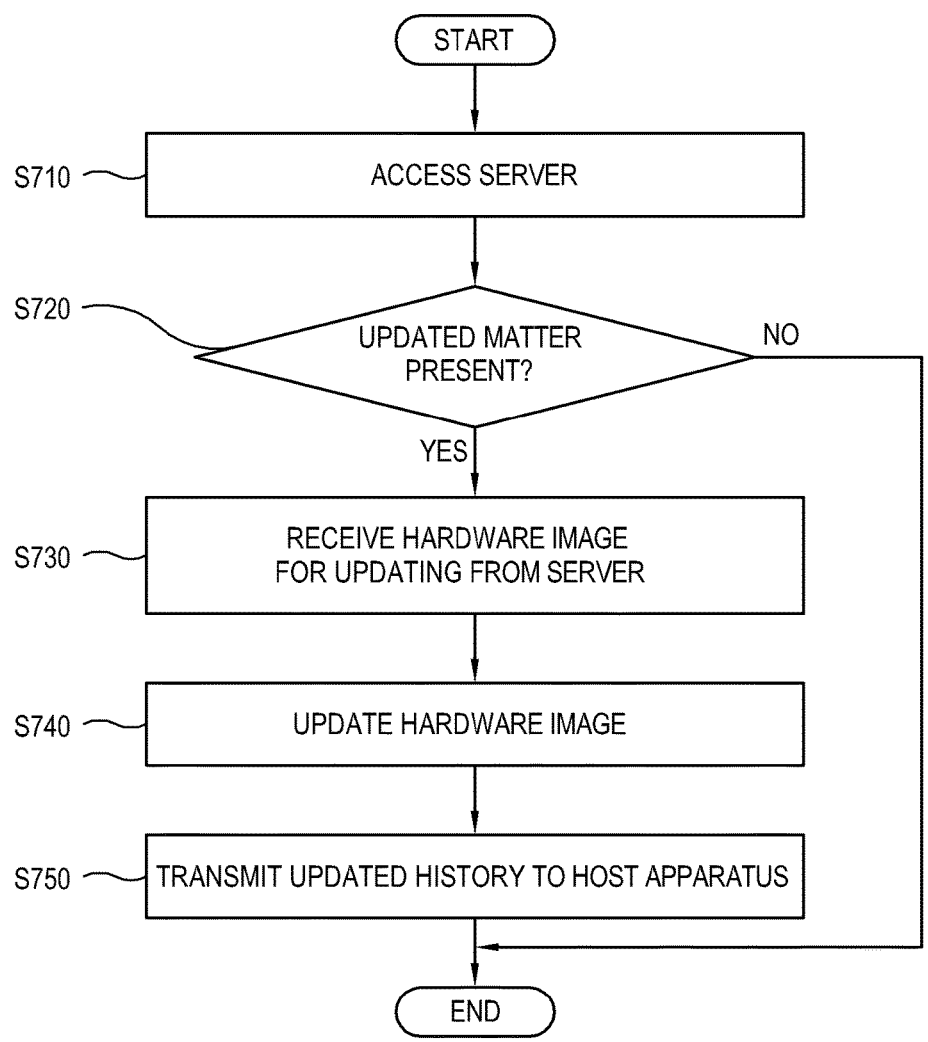
FIG. 19 is a flowchart illustrating an example of updating a hardware image stored in a sensing apparatus by the sensing apparatus according to an eleventh example embodiment.

FIG. 19 is a flowchart illustrating an example of updating a hardware image stored in a sensing apparatus by the sensing apparatus according to an eleventh example embodiment.

As illustrated in FIG. 19, at operation S710 the sensing apparatus accesses the server. At operation S720 the sensing apparatus determines whether updated matters are present in the previously stored hardware image.

If it is determined that the updated matters are present, at operation S730 the sensing apparatus receives a hardware image to be updated from the server. Of course, the host apparatus may receive the hardware image to be updated in response to a user's updating instruction. Further, the host apparatus may automatically receive the updated matters if the sensing apparatus determines that the updated matters are present like this example embodiment.

At operation S740 the sensing apparatus updates the previously stored hardware image with the hardware image newly received from the server.

At operation S750 the sensing apparatus transmits an updating history to the host apparatus. Thus, the host apparatus can recognize the updated situations of the hardware image of the sensing apparatus.

Figure 20:
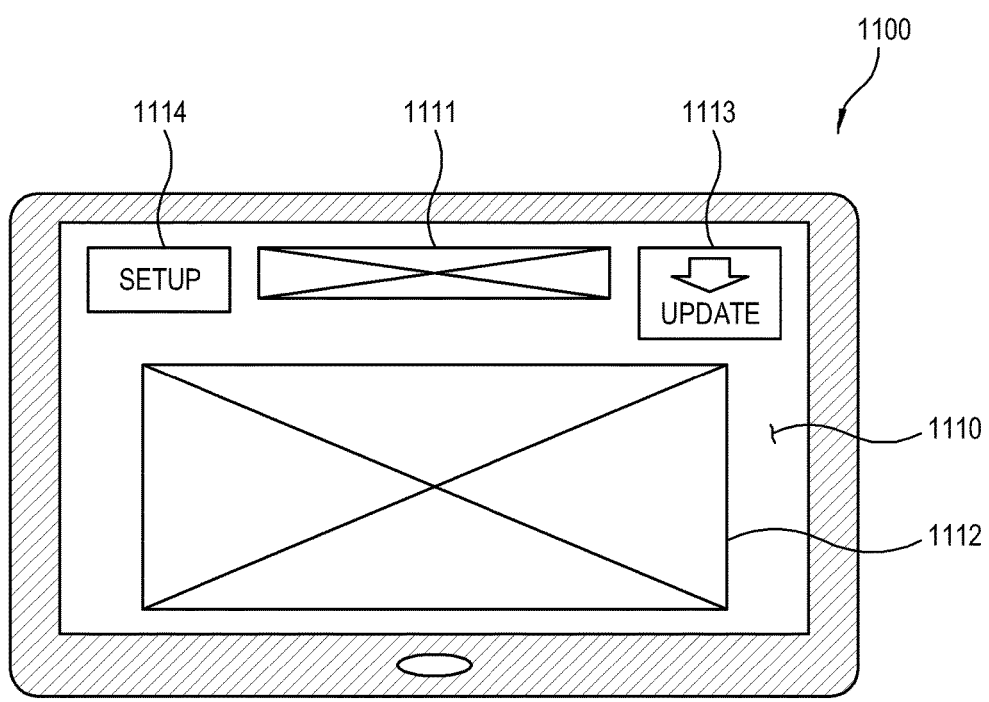
FIG. 20 is a diagram illustrating an example of a UI displayed on a host apparatus according to a twelfth example embodiment.

FIG. 20 is a diagram illustrating an example of a UI 1110 displayed on a host apparatus 1110 according to a twelfth example embodiment.

As illustrated in FIG. 20, the host apparatus 1100 according to a twelfth example embodiment executes an application that processes sensing information to be sensed in the sensing apparatus and displayed as an image. As the application is executed, the host apparatus 1100 displays a UI 1110. The UI 1110 illustrated in this embodiment is merely an example, and may be designed to have various forms.

The UI 1110 includes a region 1111 for showing the kind of activated sensor module being in use or the function of the sensor module, a region 1112 for showing the sensing information to be sensed by the sensor module, a region for showing that matters for updating the hardware image of the sensing apparatus are present, and a region 1114 for changing general settings of the sensing apparatus.

The function display region 1111 shows which one of the sensor modules is being in current use, and the sensing information display region 1112 shows the sensing information of the sensor module transmitted from the sensing apparatus to the host apparatus 1100. If a user clicks the updating matter notification region 1113, the host apparatus 1100 updates the hardware image. If a user clicks the setting change region 1114, a UI for changing the settings related to the sensing apparatus may be separately displayed.

In the foregoing example embodiments, the number of sensor modules mountable to the sensing apparatus at a time is one. However, two or more sensor modules may be mounted to the sensing apparatus and used at a time in accordance with design of the sensing apparatus.

Figure 21:
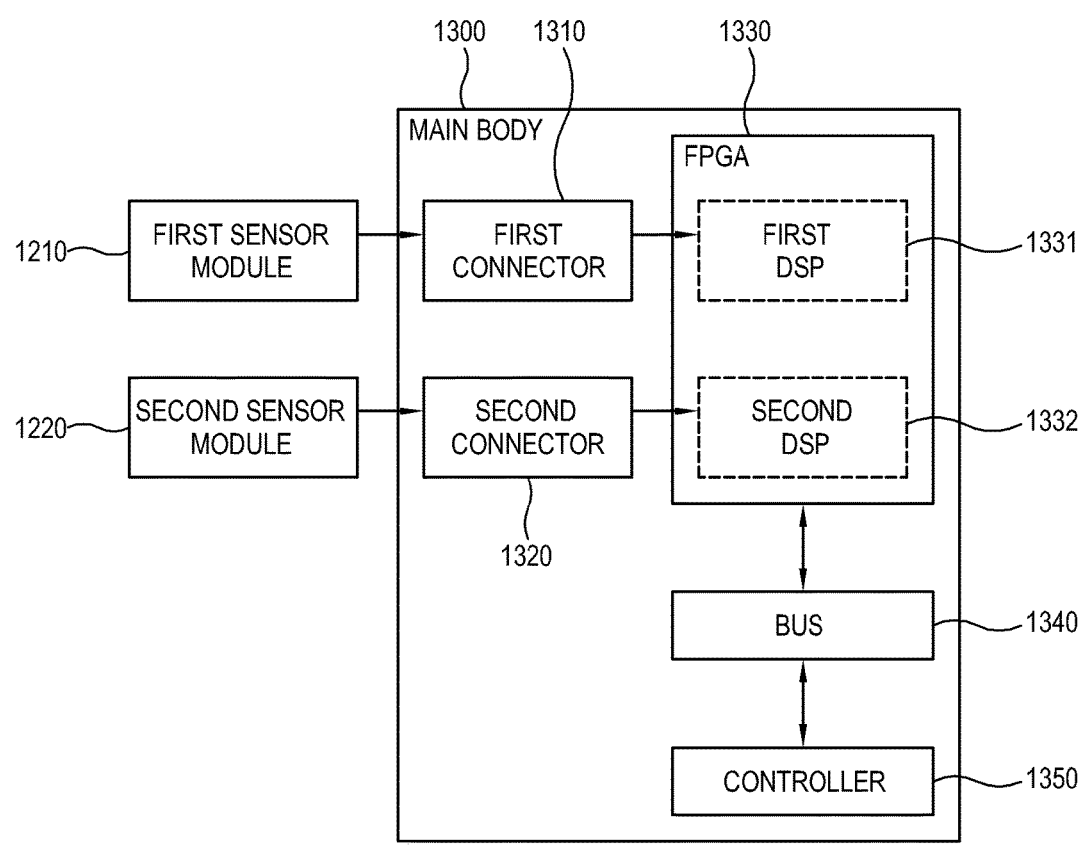
FIG. 21 is a block diagram illustrating an example sensing apparatus according to a thirteenth example embodiment.

FIG. 21 is a block diagram illustrating an example sensing apparatus according to a thirteenth example embodiment;

As illustrated in FIG. 21, a main body 1300 of the sensing apparatus according to the thirteen example embodiment includes a first connector 1310, a second connector 1320, an FPGA 1330 (e.g., including first and second DSPs 1331, 1332), a bus 1340 and a controller (e.g., including processing circuitry) 1350. The FPGA 1330, the bus 1340 and the controller 1350 are equivalent to those of the foregoing example embodiment, and thus details thereof will be omitted. In this example embodiment, the first connector 1310 and the second connector 1320 are provided so that two sensor modules 1210 and 1220 can be simultaneously connected to the main body 1300. Thus, in the state that a first sensor module 1210 is being connected to the first connector 1310, a second sensor module 1220 may be connected to the second connector 1320. Of course, three or more connectors may be designed to be provided in the main body 1300.

On the contrary to the case where one sensor module 1210 or 1220 is mounted to the main body 1300, the FPGA 1330 in this embodiment has to operate corresponding to both the first sensor module 1210 and the second sensor module 1220. As described above, the FPGA 1330 has a parallel structure in itself, so that the resources of the FPGA 1330 can be respectively set to operate as individual processes as long as the resource is in an allowable range.

That is, the controller 1350 in this case acquires a first hardware image corresponding to the first sensor module 1210 and a second hardware image corresponding to the second sensor module 1220. Further, the controller 1350 sets some resources of the FPGA 1330 as a first DSP 1331 for processing a sensing signal from the first sensor module 1210 in accordance with the first hardware image, and sets the other resources of the FPGA 1330 as a second DSP 1332 for processing a sensing signal from the second sensor module 1220 in accordance with the second hardware image.

Further, the controller 1350 acquires a first bus architecture corresponding to the first sensor module 1210 and a second bus architecture corresponding to the second sensor module 1220, and resets the bus 1340.

In this manner, the sensing apparatus can simultaneously perform sensing and processing of two or more sensor module. However, when two or more DSPs 1331 and 1332 are simultaneously set in the FPGA 1330, the resource of the FPGA 1330 has to be within the allowable range and therefore a UI is needed to inform a user of the current usage or consumption of the resources in the FPGA 1330.

Figure 22:
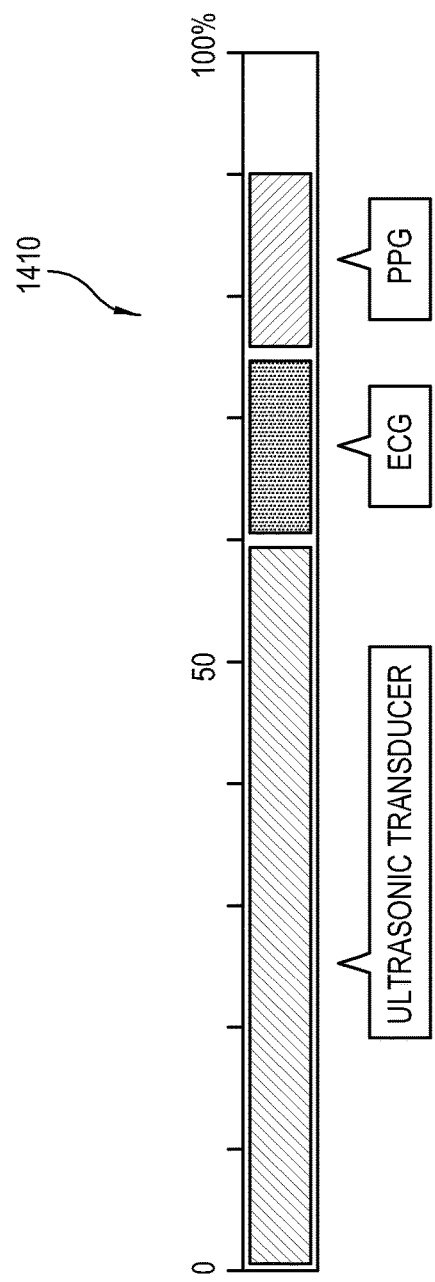
FIG. 22 is a diagram illustrating an example in which a host apparatus according to the thirteenth example embodiment displays a UI showing resource usage of an FPGA of the sensing apparatus.

FIG. 22 is a diagram illustrating an example in which a host apparatus according to the thirteenth example embodiment displays a UI 1410 showing resource usage of an FPGA of the sensing apparatus.

As illustrated in FIG. 22, the host apparatus may display the UI 1410 showing how much the sensor module currently mounted to the sensing apparatus and being in use occupies the resource of the FPGA of the sensing apparatus. The UI 1410 may be displayed when a user clicks a setup button 1114 (see FIG. 20) as previously illustrated in FIG. 20.

There are no limit to the shape of the UI 1410. For example, a resource share of the DSP corresponding to the currently activated sensor module is displayed as a bar showing a resource share percentage from 0% to 100%. In FIG. 22, the DSP corresponding to the ultrasonic transducer occupies 60% of the total resources of the FPGA, the DSP corresponding to the ECG sensor occupies 15%, the DSP corresponding to the PPG sensor occupies 15%, and nothing occupies 10%.

Through the UI 1410, a user can easily recognize the current resource usage of the FPGA.

If the plurality of sensor modules are simultaneously used, the sensing apparatus may be variously designed with regard to how to use the resource of the FPGA.

Figure 23:
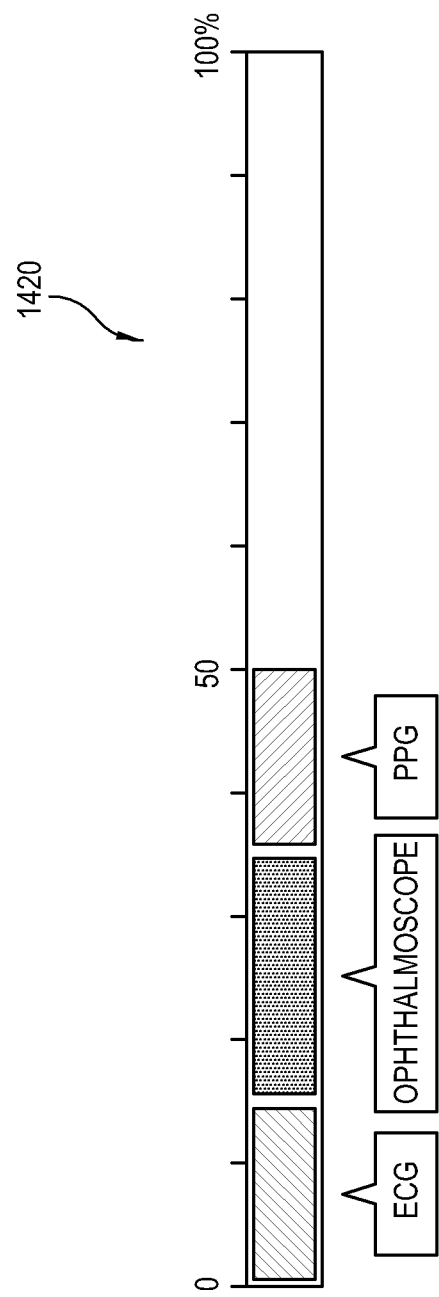
FIG. 23 is a diagram illustrating an example in which a host apparatus according to a fourteenth example embodiment displays a UI showing resource usage of an FPGA of a sensing apparatus.

FIG. 23 is a diagram illustrating an example in which a host apparatus according to a fourteenth example embodiment displays a UI 1420 showing resource usage of an FPGA of a sensing apparatus.

As illustrated in FIG. 23, the UI 1420 shows that the current resource of the FPGA of the sensing apparatus is occupied by the DSP of the ECG sensor as much as 15%, by the DSP of the ophthalmoscope as much as 20% and by the DSP of the PPG sensor as much as 15%, and 50% of resources is available.

This state means that the ECG sensor, the ophthalmoscope and the PPG sensor are all mounted to and activated in the sensing apparatus, or that the previously use state of the FPGA is continued. That is, even if the PPG sensor is detached from the main body after it is used, the circuit conditions of the FPGA set while using the PPG sensor may remain as it is.

In this state, a new ultrasonic transducer may be mounted to the main body of the sensing apparatus. If the resource of the FPGA needed for setting the DSP corresponding to the ultrasonic transducer is less than the currently available resource of the FPGA, the sensing apparatus uses the available resource of the FPGA in setting the DSP corresponding to the new ultrasonic transducer without changing the settings of the other DSPs currently occupying the resource of the FPGA.

On the other hand, the resource of the FPGA needed for setting the DSP corresponding to the ultrasonic transducer may be more than the currently available resource of the FPGA. For example, if the resource of the FPGA needed for setting the DSP corresponding to the ultrasonic transducer is 60% but the currently available resource of the FPGA is 50%, at least some of the DSPs currently occupying the resource of the FPGA has to be deleted.

There are two deleting methods. One is to delete all the DSPs currently occupying the resource of the FPGA and reset the resource of the FPGA, and the other is to selectively delete one or more DSPs currently occupying the resource of the FPGA in accordance with preset priority.

FIG. 24 is a diagram illustrating an example of a list 1430 showing a resource usage priority set in the sensing apparatus according to the fourteenth example embodiment.

As illustrated in FIG. 24, when there is a need of setting a DSP corresponding to a new hardware image, the sensing apparatus calls a list where resource usage priority of the FPGA is designated. The list 1430 may be stored in the sensing apparatus, and the host apparatus calls the list 1430 as necessary to reset the sensing apparatus. The priority designated in the list 1430 may be freely adjustable by a user.

In the example list 1430 illustrated in FIG. 24, the ultrasonic transducer is most important, and then the ECG sensor, the PPG sensor, the dermatoscope and the ophthalmoscope are arranged in order of importance. If the ECG sensor, the ophthalmoscope and the PPG sensor are determined as the kinds of sensor module currently using the resource of the FPGA, and the sensing apparatus needs to delete one or more among them, the ophthalmoscope having the lowest priority is selected among three sensor modules in the list 1430. Then, the sensing apparatus deletes the DSP corresponding to the selected ophthalmoscope from the FPGA and thus secure an available resource for setting the DSP corresponding to the new ultrasonic transducer.

If a necessary resource is not secured even after deleting the DSP corresponding to one sensor module, the sensing apparatus may delete the DSPs in accordance with priorities of the list 1430 until the available resource is secured.

Figure 25:
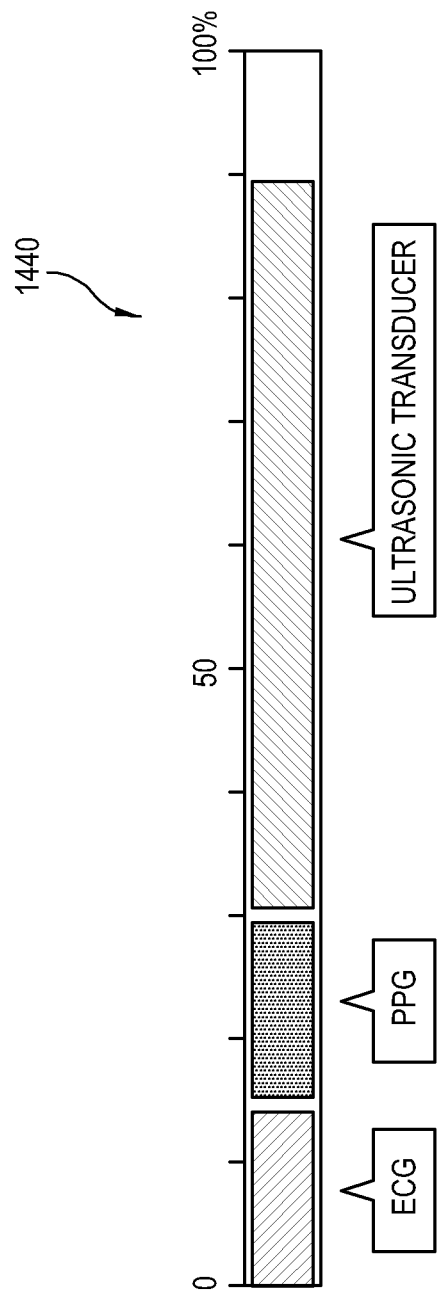
FIG. 25 is a diagram illustrating an example of displaying a UI when the resource usage of the FPGA of the sensing apparatus is changed from the UI of FIG. 23.

FIG. 25 is a diagram illustrating an example of displaying a UI 1440 when the resource usage of the FPGA of the sensing apparatus is changed from the UI of FIG. 23.

As illustrated in FIG. 25, the UI 1440 shows change in the resource usage in real time as the sensing apparatus changes the resource usage of the FPGA. For example, the sensing apparatus deletes the DSP corresponding to the ophthalmoscope among the DSPs occupying the resource of the FPGA and sets a DSP corresponding to a new ultrasonic transducer in order to use the new ultrasonic transducer.

Therefore, the UI 1440 shows the resource usage of the FPGA after change, e.g., that the DSP corresponding to the ECG sensor has a resource share of 15%, the DSP corresponding to the PPG sensor has a resource share of 15%, the DSP corresponding to the ultrasonic transducer has a resource share of 60%, and an available resource is 10%.

In this manner, the sensing apparatus utilizes the resource of the FPGA.

In the foregoing example embodiments, the sensing apparatus and the host apparatus may communicate with each other through Wi-Fi, Bluetooth, and the like short-range wireless network. Alternatively, the sensing apparatus and the host apparatus may be designed to communicate in a wired manner or with each other through a wide area network.

Figure 26:
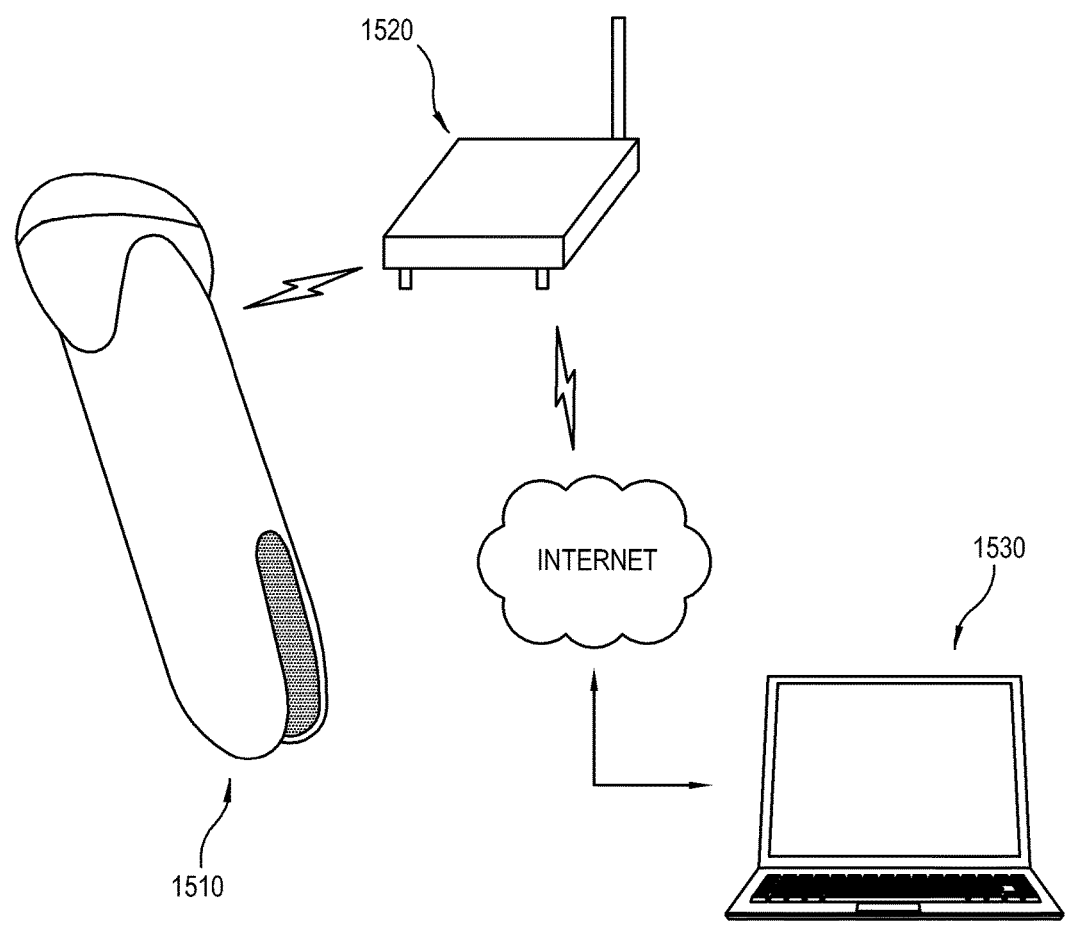
FIG. 26 is a diagram illustrating an example sensing apparatus and a host apparatus according to a fifteenth example embodiment.

FIG. 26 is a diagram illustrating a sensing apparatus 1510 and a host apparatus 1530 according to a fifteenth example embodiment;

As illustrated in FIG. 26, a system according to the fifteenth example embodiment includes the sensing apparatus 1510 and the host apparatus 1530. The sensing apparatus 1510 and the host apparatus 1530 are equivalent to those of the foregoing example embodiments, and thus repetitive descriptions thereof will be avoided.

According to this example embodiment, the sensing apparatus 1510 and the host apparatus 1530 are not within a range short enough to make a user use them together, but remote from each other at a relatively long distance. For example, a patient himself/herself or a patient's care provider may use the sensing apparatus 1510 for the patient, and a doctor at a hospital may offer teleconsultation based on the sensing information received from the sensing apparatus 1510.

The sensing apparatus 1510 and the host apparatus 1530 may access a wide area network such as the Internet to communicate with each other at a relatively long distance. For example, the sensing apparatus 1510 wirelessly accesses an access point (AP) 1520 connected to Internet, and communicates with the host apparatus 1530 through the AP 1520. Therefore, the sensing apparatus 1510 can transmit the sensing information to the host apparatus 1530 at a long distance.

In accordance with design of the sensing apparatus, a specific sensor may be very important. For example, if a sensor for sensing a certain biological characteristic is designed to be involved in the sensing apparatus, the elements of the sensing apparatus may be different from those of the foregoing example embodiments. Below, an embodiment related to this will be described.

Figure 27:
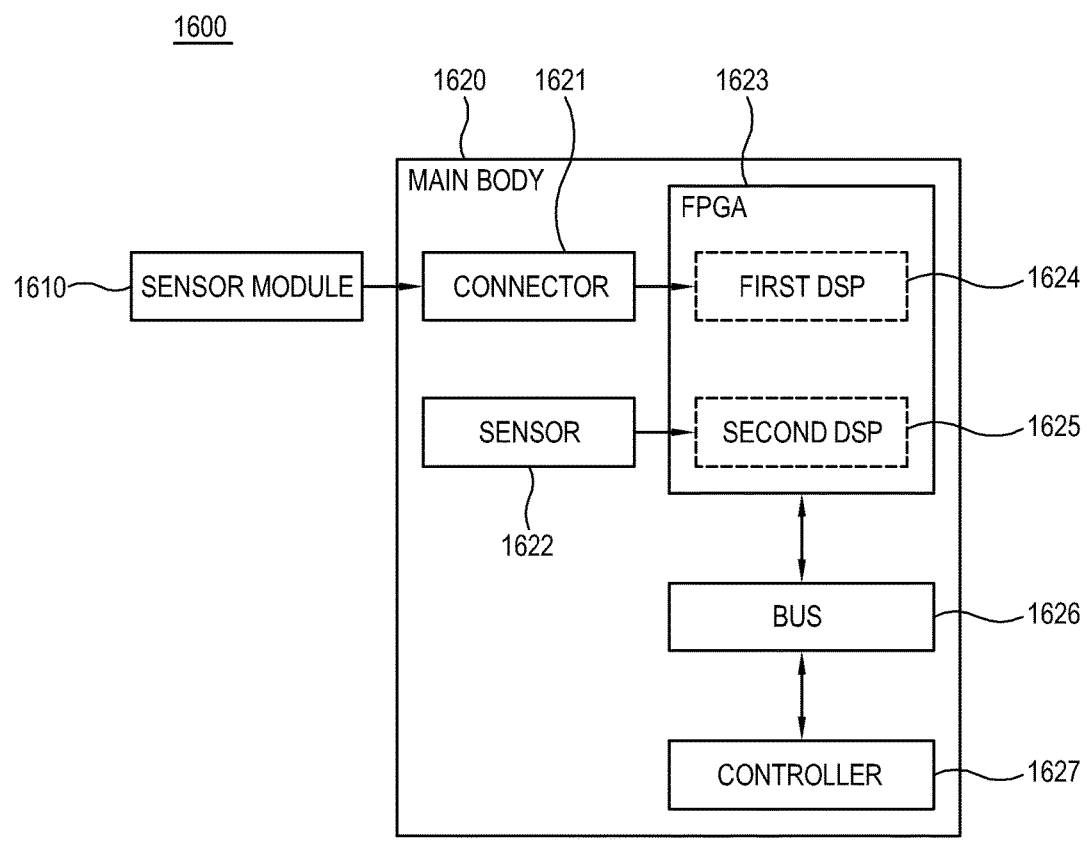
FIG. 27 is a block diagram illustrating an example sensing apparatus according to a sixteenth example embodiment.

FIG. 27 is a block diagram illustrating an example sensing apparatus 1600 according to a sixteenth example embodiment;

As illustrated in FIG. 27, a main body 1620 of the sensing apparatus 1600 according to a sixteenth example embodiment includes a connector 1621, a sensor 1622, an FPGA 1623, a bus 1626, and a controller (e.g., including processing circuitry) 1627. The FPGA 1623, the bus 1626 and the controller 1627 are equivalent to those of the foregoing example embodiments, and thus repetitive descriptions thereof will be avoided.

In this example embodiment, the sensor 1622 for sensing a specific characteristic of an object is stationarily provided in the main body 1620. With this, a sensor module 1610 is mounted to the connector 1621, and thus the FPGA 1623 has to drive both a first DSP 1624 corresponding to the sensor module 1610 connected to the connector 1621 and a second DSP 1625 corresponding to the sensor 1622. Here, as described above, the first DSP 1624 has to be reset corresponding to the kind of sensor module 1610 connected to the connector 1621.

The sensor 1622 is stationarily used in the main body 1620, and therefore the second DSP 1625 is not deleted but remain in the FPGA 1623 on the contrary to the first DSP 1624. That is, while the first DSP 1624 is reset as the sensor module 1610 mounted to the connector 1621 is replaced, the second DSP 1625 is not reset but remain to thereby process the sensing signal from the sensor 1622. Of course, the second DSP 1625 may be updated by the controller 1627 if updating matters are present.

In this example embodiment, the resource of one FPGA 1623 is shared between the sensor module 1610 and the sensor 1622. However, the main body 1620 may be designed differently from this embodiment.

Figure 28:
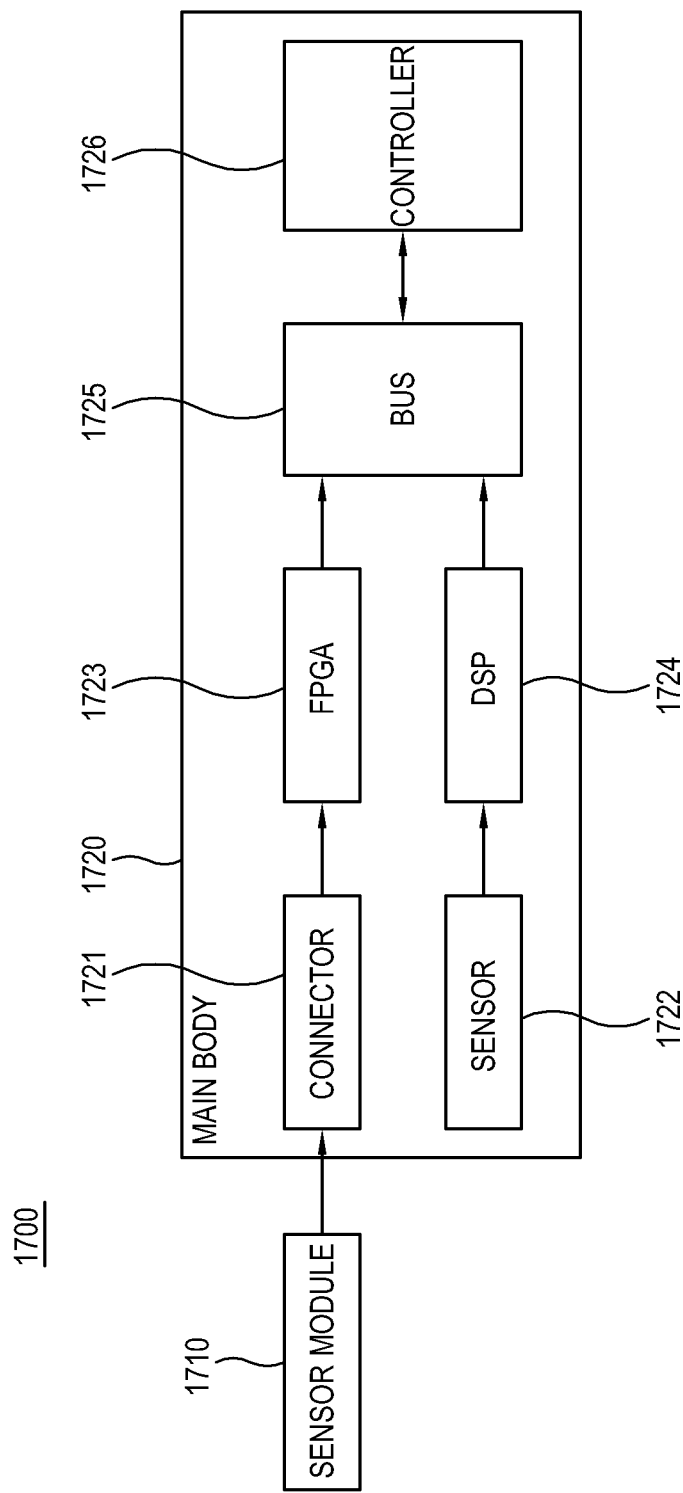
FIG. 28 is a block diagram illustrating an example sensing apparatus according to a seventeenth example embodiment.

FIG. 28 is a block diagram illustrating an example sensing apparatus 1700 according to a seventeenth example embodiment;

As illustrated in FIG. 28, a main body 1720 of the sensing apparatus 1700 according to the seventeenth example embodiment includes a connector 1721, a sensor 1722, an FPGA 1723, a DSP 1724, a bus 1725, and a controller (e.g., including processing circuitry) 1726. The connector 1721 to which the sensor module 1710 is connected and the built-in sensor 1722 of the main body 1720 are equivalent to those of the sixteenth example embodiment.

In this example embodiment, the FPGA 1723 processes only the sensing signal from the sensor module 1710 connected to the connector 1721. The sensing signal from the sensor 1722 is processed by the DSP 1724. That is, the sensor 1722 is stationarily installed in the main body 1720, and therefore the DSP 1724 corresponding to the sensor 1722 is provided separately from the FPGA 1723. On the contrary to the FPGA 1723, the DSP 1724 is not resettable but designed to correspond to the sensor 1722.

As described in the foregoing example embodiments, the FPGA 1723 is reset corresponding to the sensor module 1710 connected to the connector 1721. Since the DSP 1724 corresponding to the sensor 1722 is present, it is possible to decrease the total resource of the FPGA 1723 as compared with that of the sixteenth example embodiment.

In the foregoing example embodiments, the sensing apparatus and the host apparatus are described as individual apparatuses. Alternatively, the sensing apparatus may be designed to serve as the host apparatus and thus the sensing apparatus and the host apparatus may be integrated into a single apparatus.

Figure 29:
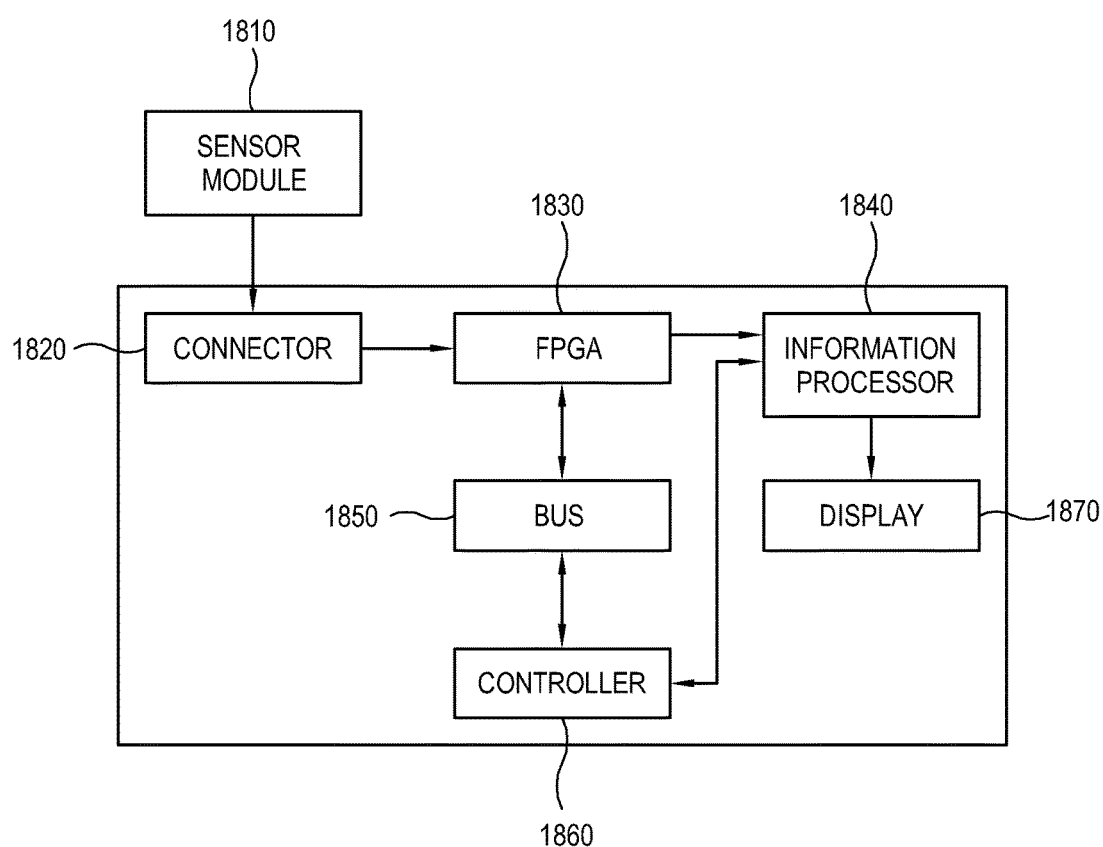
FIG. 29 is a block diagram illustrating an example medical apparatus according to an eighteenth example embodiment.

FIG. 29 is a block diagram illustrating an example medical apparatus 1800 according to an eighteenth example embodiment.

As illustrated in FIG. 29, the medical apparatus 1800 according to an eighteenth example embodiment includes a connector 1820 to which one or more sensor modules 1810 may be selectively mounted, an FPGA 1830 which generates sensing information by processing a sensing signal from the sensor module 1810 mounted to the connector 1820, an information processor 1840 which processes the sensing information processed by the FPGA 1830, a bus 1850, a controller (e.g., including processing circuitry) 1860, and a display 1870 for displaying an image of the sensing information.

The elements and operations in this embodiment are basically the same as those of the foregoing example embodiment. In this example embodiment, the sensing information output from the FPGA 1830 is sent to and processed by the information processor 1840, so that the display 1870 displays an image based on the sensing information. On the contrary to the foregoing example embodiments where the information processor and the display are provided in the host apparatus and the sensing information is transmitted from the sensing apparatus to the host apparatus, such elements are all provided in the medical apparatus 1800 in this example embodiment.

The foregoing example embodiments were described focusing on the sensing apparatus of the medical apparatus system. However, the present disclosure is not limited to the sensing apparatus of the medical apparatus, but may be for example applied to not the medical apparatus but a general-purpose electronic apparatus such as a mobile phone.

Figure 30:
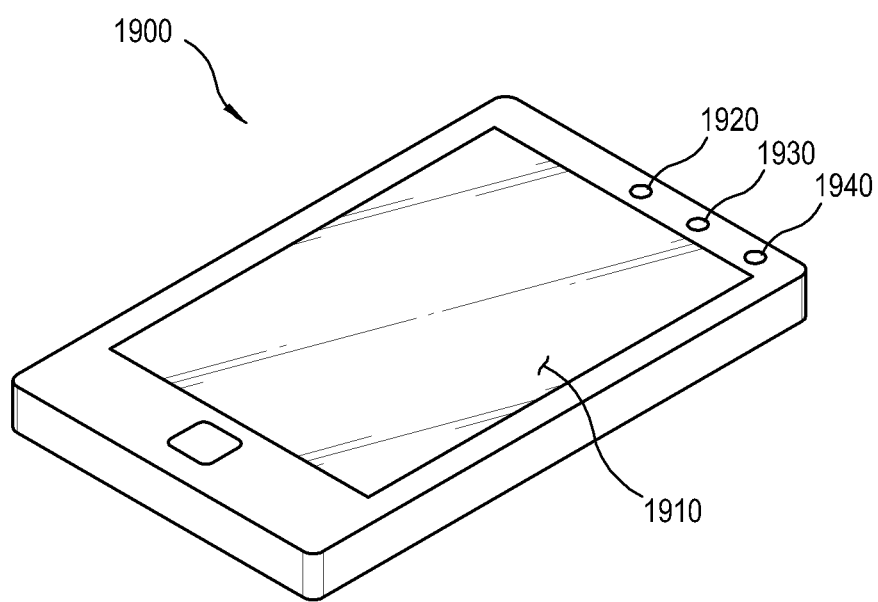
FIG. 30 is a diagram illustrating an example of an electronic apparatus according to a nineteenth example embodiment.

FIG. 30 is a diagram illustrating an example of an electronic apparatus 1900 according to a nineteenth example embodiment.

As illustrated in FIG. 30, the electronic apparatus 1900 according to the nineteenth example embodiment may be achieved by a mobile phone, a tablet computer or the like having the display 1910, but is not limited thereto. In this example embodiment, the electronic apparatus 1900 is the mobile phone, but not limited thereto. The electronic apparatus 1900 may be achieved by a wearable device such as a smart watch, a head-mountable device, or the like, but is not limited thereto.

The electronic apparatus 1900 may further include various kinds of sensors 1920, 1930 and 1940 such as a camera, an infrared sensor, etc. Such a sensor 1920, 1930 or 1940 may be built in or stationarily installed in the electronic apparatus 1900.

However, the electronic apparatus 1900 may be designed so that the sensors 1920, 1930 and 1940 are not stationarily but detachably installed in the electronic apparatus 1900. For example, the electronic apparatus 1900 may be an apparatus into which a plurality of modules are assembled, In this case, many sensors 1920, 1930 and 1940 may be selected by a user and then applied to the electronic apparatus 1900.

Like this, if the sensors 1920, 1930 and 1940 are stationarily provided in the electronic apparatus 1900, the electronica apparatus 1900 operates differently from that of when the sensors are detachably provided.

In the foregoing example embodiments, the sensors are detachably provided, the electronic apparatus 1900 determines the kind of sensor when the sensor is mounted thereto, and resets the FPGA in accordance with the hardware image corresponding to the determined kind of sensor.

On the other hand, the electronic apparatus 1900 in this example embodiment with the built-in sensors 1920, 1930 and 1940 determines the kind or identification name of sensor 1920, 1930 or 1940 when it is sensed that the sensor 1920, 1930 or 1940 is activated, and resets the FPGA in accordance with the hardware image corresponding to the determined kind or identification name. In this case, the sensors 1920, 1930 and 1940 have initial states of inactivation.

Figure 31:
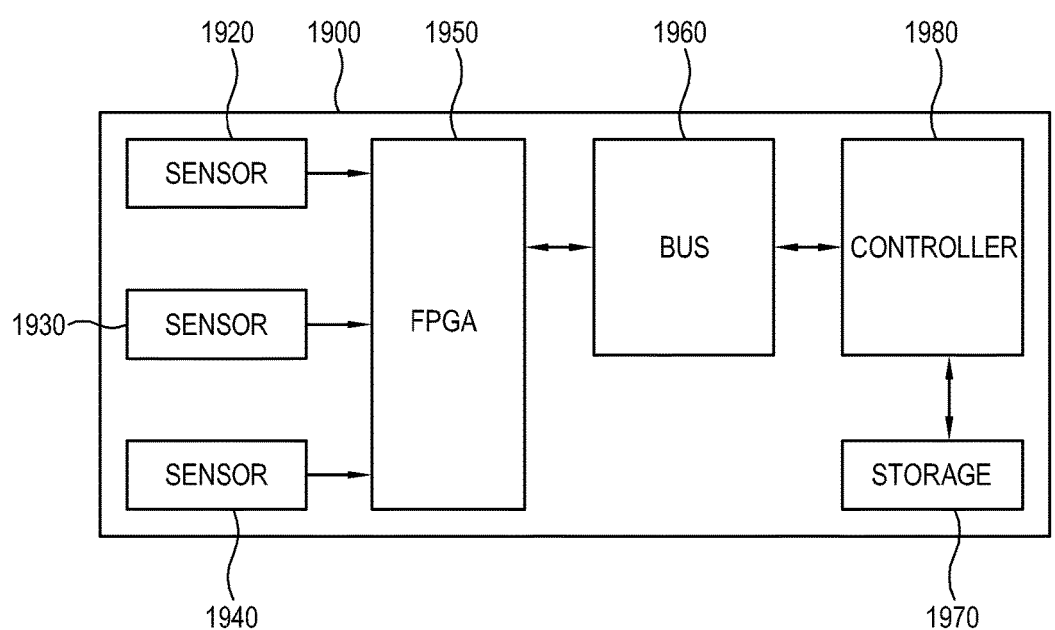
FIG. 31 is a block diagram illustrating an example electronic apparatus according to the nineteenth example embodiment.

FIG. 31 is a block diagram illustrating an example electronic apparatus 1900 according to the nineteenth example embodiment.

As illustrated in FIG. 31, the electronic apparatus 1900 includes a plurality of sensors 1920, 1930 and 1940, an FPGA 1950, a bus 1960, a storage 1970, and a controller (e.g., including processing circuitry) 1980. The FPGA 1950, the bus 1960, the storage 1970 and the controller 1980 are basically equivalent to those of the foregoing example embodiment, and thus repetitive descriptions will be avoided.

In an initial stage, the plurality of sensors 1920, 1930 and 1940 are inactivated. In this state, if one or more sensors 1920, 1930 and 1940 become activated, the controller 1980 acquires hardware images corresponding to the activated sensors 1920, 1930 and 1940 from the storage 1970 or the outside, and resets the FPGA 1950. If the plurality of sensors 1920, 1930 and 1940 are activated, the controller 1980 shares and resets the resource of the FPGA 1950 in accordance with the hardware images of the sensors 1920, 1930 and 1940.

Here, the activated states of the sensors 1920, 1930 and 1940 refer to that the sensors 1920, 1930 and 1940 are powered on and thus fully operate. On the other hand, the inactivated states of the sensors 1920, 1930 and 1940 may have many meanings, for example including states where the sensors 1920, 1930 and 1940 are shut down receiving no driving power, states where the sensors 1920, 1930 and 1940 receive no driving power but standby power, states where the sensors 1920, 1930 and 1940 do not operate regardless of supply of the driving power, etc.

Below, a method of controlling the electronic apparatus 1900 will be described in greater detail.

Figure 32:
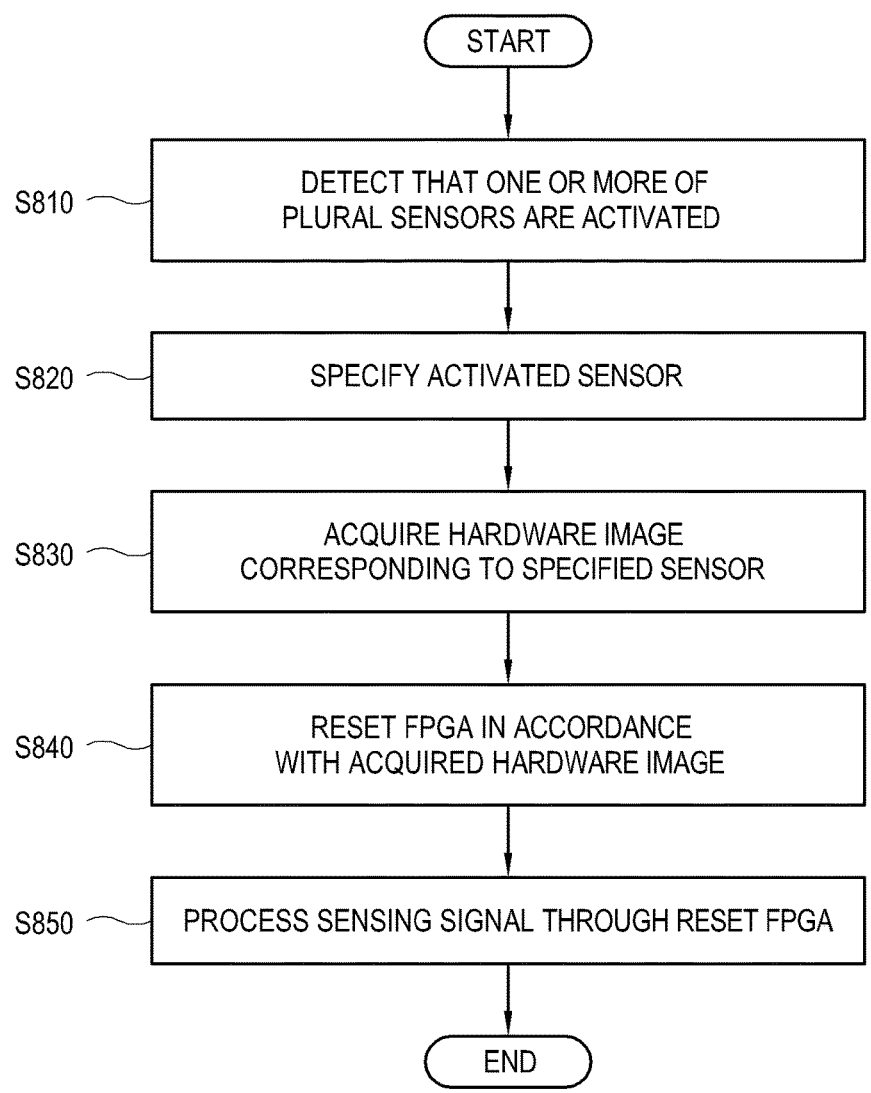
FIG. 32 is a flowchart illustrating an example of controlling an example embodiment according to a twentieth example embodiment.

FIG. 32 is a flowchart of controlling an example embodiment according to a twentieth example embodiment;

As illustrated in FIG. 32, at operation S810 the electronic apparatus detects that one or more of plural sensors are activated.

At operation S820 the electronic apparatus specifies the activated sensor. The sensor may be specified by determining the kind of sensor or determining the identification name of the sensor.

At operation S830 the electronic apparatus acquires a hardware image corresponding to the specified sensor.

At operation S840 the electronic apparatus resets the FPGA in accordance with the acquired hardware image.

At operation S850 the electronic apparatus processes a sensing signal from the activated sensor through the reset FPGA.

In the foregoing example embodiment, the internal hardware structure of the FPGA is reset in accordance with the hardware image corresponding to the sensor module or the sensor. However, the present disclosure may be embodied by resetting software or data as well as the hardware structure of the FPGA in accordance with the hardware images.

Figure 33:
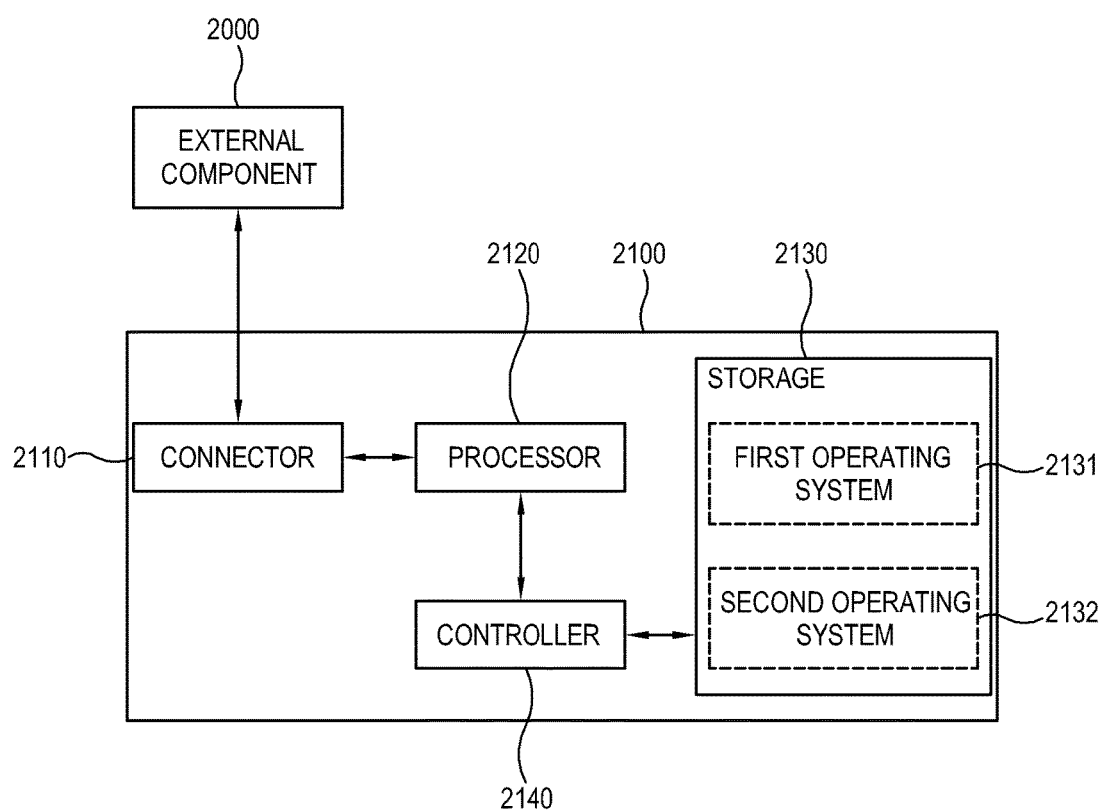
FIG. 33 is a block diagram illustrating an example electronic apparatus according to a twenty-first example embodiment.

FIG. 33 is a block diagram illustrating an example electronic apparatus 2100 according to a twenty-first example embodiment; and As illustrated in FIG. 33, the electronic apparatus 2100 according to a twenty-first example embodiment includes a connector 2110 to which an external component 2000 is connected, a processor 2120 which processes data of the external component 2000 connected to the connector 2110, a storage 2130 which stores data, and a controller (e.g., including processing circuitry) 2140 which performs computation corresponding to the process of the processor 2120.

The external component 2000 may be equivalent to the sensor module described in the foregoing example embodiment. Besides, the external component 2000 may be a general-purpose electronic apparatus or a memory device. However, the external component 200 connectable to the connector 2110 is recognizable in a preset first operating system 2131, but not recognizable in a second operating system 2132. That is, if the processor 2120 is currently driven under the second operating system 2132, it may be difficult for the processor 2120 to recognize the external component 2000 and communicate with the external component 2000 even though the external component 2000 is connected to the connector 2110.

Thus, if the controller 2140 detects the external component 2000 is connected to the connector 2110, the kind or identification name of the external component 200 is specified. The controller 2140 acquires the first operating system 2131 corresponding to the specified external component 2000, loads the first operating system 2131 to the processor 2120, and initializes the processor 2120 under the first operating system 2131. Thus, the processor 2120 can communicate with the external component 2000 and process data of the external component 2000.

Of course, if the processor 2120 is driven under the first operating system 2131, the processor 2120 can directly communicate with the external component 2000.

In this example embodiment, the operating system for driving the processor 2120 was described. Alternatively, a general application, reference information of hardware, and the like examples are also possible.

Figure 34:
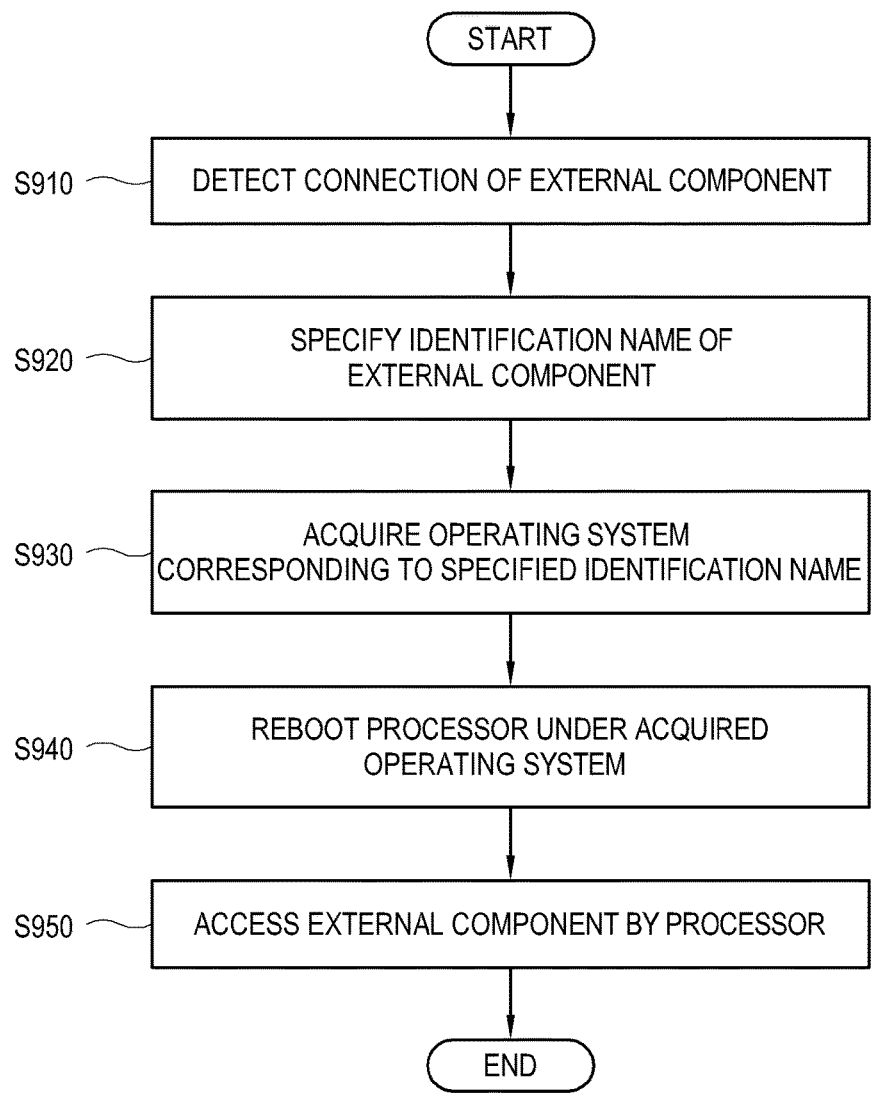
FIG. 34 is a flowchart illustrating an example of controlling an electronic apparatus according to the twenty-first example embodiment.

FIG. 34 is a flowchart illustrating an example of controlling an electronic apparatus according to the twenty-first example embodiment.

As illustrated in FIG. 34, at operation S910 the electronic apparatus detects that the external component is connected.

At operation S920 the electronic apparatus specifies the identification name of the detected external component.

At operation S930 the electronic apparatus acquires an operating system corresponding to the specified identification name.

At operation S940 the electronic apparatus reboots the processor under the acquired operating system.

At operation S950 the electronic apparatus accesses the external component through the rebooted processor.

Thus, the electronic apparatus may operate to recognize the external component as the external component is connected.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments. The program command recorded in this storage medium may be specially designed and configured according to the example embodiments, or may be publicly known and available to those skilled in the art of computer software.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. An electronic apparatus comprising:
an interface comprising interface circuitry configured to be connectable with at least one of a plurality of sensor modules each sensor module comprising at least one sensor for sensing an object;
a programmable circuit configured to process a sensing signal obtained by sensing the object through each sensor module; and
a controller configured to identify at least one hardware image corresponding to the sensor module connected to the interface from among a plurality of hardware images, to load the at least one identified hardware image to the programmable circuit, and to control the programmable circuit to process a sensing signal corresponding to the at least one hardware image,
wherein the controller is further configured to, in response to the sensor module transmitting the sensing signal through the interface being identified, identify whether a history of using the identified sensor module is present, and to retrieve the hardware image corresponding to the identified sensor module from a storage in response to the history of using the identified sensor module being present.

2. The electronic apparatus according to claim 1, wherein the programmable circuit comprises a field programmable gate array (FPGA),
the controller is configured to change an internal circuit structure of the FPGA based on the hardware images comprising a circuit layout of a digital signal processor (DSP) configured to correspond to the sensor module connected to the interface.

3. The electronic apparatus according to claim 2, wherein the controller is configured to change a system bus connected between the controller and the FPGA having a changed internal circuit structure.

4. The electronic apparatus according to claim 2, wherein if sensing signals are received from two or more sensor modules through the interface, the controller is configured to reset the FPGA by sharing resources of the FPGA and changing the shared resources based on the circuit layouts of the DSPs respectively corresponding to the two or more sensor modules.

5. The electronic apparatus according to claim 4, wherein if the resources for a third sensor module for transmitting the sensing signal through the interface are insufficient while the resources of the FPGA are reset corresponding to a first sensor module and a second sensor module, the resources corresponding to one of the first sensor module and the second sensor module are reset based on a preset priority to be used in resetting the third sensor module.

6. The electronic apparatus according to claim 1, wherein the controller is configured to identify the sensor module based on identification information of the sensor module, and to acquire the hardware image of the identified sensor module.

7. The electronic apparatus according to claim 6, wherein the interface is configured to selectively connect with at least one of the plurality of sensor modules.

8. The electronic apparatus according to claim 6, wherein the interface comprises a plurality of terminals configured to be electrically connected to the sensor module when the sensor module is mounted, and the sensor module is configured to apply a high or low state to each of the plurality of terminals,
the controller is configured to identify the sensor module based on the states of the plurality of terminals applied by the sensor module.

9. The electronic apparatus according to claim 6, wherein the sensor module is configured to previously store the identification information,
the controller is configured to acquire the identification information from the sensor module when the sensor module is mounted to the interface.

10. The electronic apparatus according to claim 1, further comprising a communicator comprising communication circuitry configured to communicate with an external apparatus, wherein the controller is configured to request the hardware image from the external apparatus through the communication circuitry if the history of using the identified sensor module is not present.

11. The electronic apparatus according to claim 1, further comprising a communicator comprising communication circuitry configured to communicate with an external apparatus comprising a display, wherein
the controller is configured to transmit sensing information generated by processing the sensing signal through the programmable circuit to the external apparatus so that the sensing information can be displayed as an image on the display.

12. The electronic apparatus according to claim 1, further comprising a display, wherein
the controller is configured to control the display to display an image based on sensing information generated by processing the sensing signal through the programmable circuit.

13. A method of controlling an electronic apparatus comprising an interface and a programmable circuit, the method comprising:
connecting the interface with at least one of a plurality of sensor modules for sensing an object;
identifying at least one hardware image corresponding to the sensor module connected to the interface from among a plurality of hardware images respectively corresponding to the plurality of sensor modules;
resetting the programmable circuit by loading the programmable circuit with the at least one identified hardware image, so that the sensor module corresponding to the loaded hardware image is capable of processing a sensing signal obtained by sensing the object;
processing the sensing signal transmitted through the interface by the reset programmable circuit,
wherein the identifying the at least one hardware image comprises determining whether a history of using the identified sensor module is present in response to the sensor module for transmitting the sensing signal through the interface being identified; and retrieving the hardware image corresponding to the identified sensor module from a storage of the electronic apparatus in response to the history of using the identified sensor module being present.

14. The method according to claim 13, wherein the programmable circuit comprises a field programmable gate array (FPGA),
the resetting the programmable circuit comprises changing an internal circuit structure of the FPGA based on the at least one identified hardware image, the hardware image comprising a circuit layout of a digital signal processor (DSP) configured to correspond to the sensor module connected to the interface.

15. The method according to claim 14, wherein the resetting the programmable circuit comprises changing a system bus of the reset FPGA.

16. The method according to claim 13, wherein the determining the at least one hardware image comprises determining the sensor module based on identification information of the sensor module, and acquiring the hardware image of the identified sensor module.

17. The method according to claim 16, wherein
the interface comprises a plurality of terminals to which the sensor module is electrically connected when the sensor module is mounted, and the sensor module is configured to apply a high or low state to each of the plurality of terminals, and
wherein the determining the sensor module comprises determining the sensor module based on the states of the plurality of terminals applied by the sensor module.

18. The method according to claim 16, wherein the sensor module previously stores the identification information, and
the determining the at least one hardware image comprises acquiring the identification information from the sensor module when the sensor module is mounted to the interface.

* * * * *